United States Patent
Ye et al.

(10) Patent No.: US 11,492,428 B2
(45) Date of Patent: *Nov. 8, 2022

(54) METHODS TO PRODUCE HETEROGENEOUS POLYETHYLENE GRANULES

(71) Applicant: ExxonMobil Chemical Patents Inc., Baytown, TX (US)

(72) Inventors: Xuan Ye, Houston, TX (US); Jonathan J. Schaefer, Baytown, TX (US); Timothy M. Boller, Houston, TX (US); Christopher S. Breiner, Pasadena, TX (US); Chi-I Kuo, Atascocita, TX (US); Kevin A. Stevens, Houston, TX (US); Logan E. Shephard, Humble, TX (US); Eyerusalem H. Mamo, Houston, TX (US); Evan J. Morris, Houston, TX (US); Shamah Lloyd, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 553 days.

This patent is subject to a terminal disclaimer.

(21) Appl. No.: 16/449,257

(22) Filed: Jun. 21, 2019

(65) Prior Publication Data
US 2019/0389988 A1  Dec. 26, 2019

Related U.S. Application Data

(60) Provisional application No. 62/688,892, filed on Jun. 22, 2018.

(51) Int. Cl.
*C08F 210/16*  (2006.01)
*C08F 4/659*  (2006.01)
(Continued)

(52) U.S. Cl.
CPC .......... *C08F 210/16* (2013.01); *C08F 2/34* (2013.01); *C08F 4/6192* (2013.01);
(Continued)

(58) Field of Classification Search
CPC .... C08F 210/16; C08F 4/65916; C08L 23/06; C08L 2205/025
See application file for complete search history.

(56) References Cited

U.S. PATENT DOCUMENTS

| | | |
|---|---|---|
| 2002/0103076 A1 | 8/2002 | Agapiou et al. |
| 2018/0258195 A1 | 9/2018 | Luo et al. |

(Continued)

FOREIGN PATENT DOCUMENTS

WO   WO 2018-012854   1/2018

OTHER PUBLICATIONS

L. H. Cross, R. B. Richards, and H. A. Willis, The Infra-Red Spectrum of Ethylene Polymer, Discuss. Faraday Soc., 9, 235-245, (1950).

(Continued)

*Primary Examiner* — Catherine S Branch
(74) *Attorney, Agent, or Firm* — ExxonMobil Chemical Patents Inc.—Law Department

(57) ABSTRACT

Methods to produce heterogeneous polyethylene granules, the method including: contacting first olefin monomers and second olefin monomers with a catalyst system in a single reaction zone to produce heterogeneous polyethylene granules and recovering the heterogeneous polyethylene granules; wherein the catalyst system includes a product of a combination including: one or more catalysts having a Group 3 through Group 12 metal atom or lanthanide metal atom; at least one activator; and optionally, one or more support material compositions; and wherein the heterogeneous polyethylene granules include a product of a combi- (Continued)

nation of: a first portion comprising a first polyethylene including the first olefin monomers and the second olefin monomers; a second portion including a second polyethylene including the first monomers and the second monomers; and wherein the first polyethylene has a higher second monomer weight percent than the second polyethylene, are provided.

24 Claims, 18 Drawing Sheets

(51) Int. Cl.
    *C08L 23/06*     (2006.01)
    *C08F 2/34*     (2006.01)
    *C08F 4/6192*     (2006.01)
    *C08F 4/622*     (2006.01)
    *C08K 3/36*     (2006.01)

(52) U.S. Cl.
    CPC ........ *C08F 4/6228* (2013.01); *C08F 4/65916* (2013.01); *C08K 3/36* (2013.01); *C08L 23/06* (2013.01); *C08L 2205/025* (2013.01)

(56) References Cited

U.S. PATENT DOCUMENTS

2018/0259662 A1    9/2018   Srinivasan
2018/0334517 A1   11/2018   Ye et al.

OTHER PUBLICATIONS

J. P. Blitz and D. C. McFaddin, The Characterization of Short Chain Branching in Polyethylene Using Fourier Transform Infrared Spectroscopy , J. Appl. Polym. Sci., 51, 13-20, (1994).

METHODS TO PRODUCE HETEROGENEOUS POLYETHYLENE GRANULES

CROSS REFERENCE TO RELATED APPLICATIONS

This application claims the benefit to Ser. No. 62/688,892, filed Jun. 22, 2018, the disclosure of which is hereby incorporated by reference in its entirety.

FIELD OF THE INVENTION

The present disclosure relates to the production of heterogeneous polyethylene granules. The present disclosure further relates to the catalyst systems and methods relating to the production of the heterogeneous polyethylene granules.

BACKGROUND OF THE INVENTION

Polyolefin polymers are widely used commercially because of their robust physical properties. For example, various types of polyethylene polymers, including high density, low density, and linear low-density polyethylenes, are some of the most commercially useful. Polyolefin polymers are typically prepared with a catalyst that polymerizes olefin monomers in a reactor, such as a gas phase reactor.

Lower density polyethylenes are often used in many applications including films to improve impact resistance, increase strength, and/or enhance tear resistance. Decreasing the density of a polyethylene may be achieved by incorporating more $C_4$-$C_8$ comonomer with ethylene during polymerization. In addition, polyethylene polymer compositions that are produced in the form of granules may be composed of different polymer species having different characteristics or morphology. Differences in morphology impact the properties of the final polymer composition and, ultimately, the end-use article. Therefore, there is a need to produce polyethylene polymer compositions with varying morphology to obtain a good balance of polymer properties.

SUMMARY OF THE INVENTION

In a class of embodiments, the invention provides for a method to produce heterogeneous polyethylene granules, the method comprising: contacting first olefin monomers and second olefin monomers with a catalyst system in a single reaction zone to produce heterogeneous polyethylene granules; wherein the catalyst system comprises a product of a combination comprising: one or more catalysts having a Group 3 through Group 12 metal atom or lanthanide metal atom; at least one activator; and one or more support material compositions; and wherein the heterogeneous polyethylene granules comprise: a first portion comprising a first polyethylene comprising the first olefin monomers and the second olefin monomers; a second portion comprising a second polyethylene comprising the first monomers and the second olefin monomers; and wherein the first polyethylene has a higher second olefin monomer weight percent than the second polyethylene, based upon the total weight of each polyethylene. For example, the difference between the second olefin monomer weight percent for the first polyethylene and the second olefin monomer weight percent in the second polyethylene can be about 5% to about 25%.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION OF THE INVENTION

Figure 1:
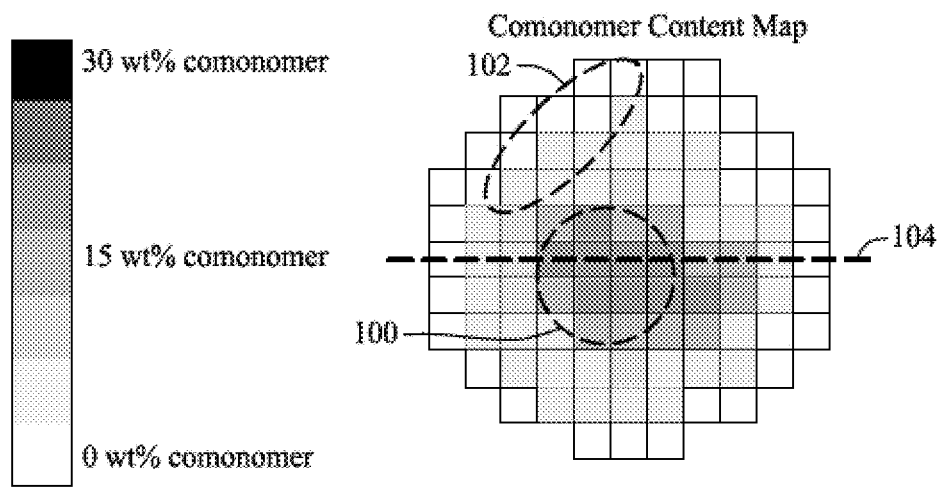
FIG. 1 illustrates a prophetic example of a comonomer content map, volume-weighted comonomer content histogram, and a comonomer content line profile for a heterogeneous polyethylene granule of the present disclosure.
Figure 1:
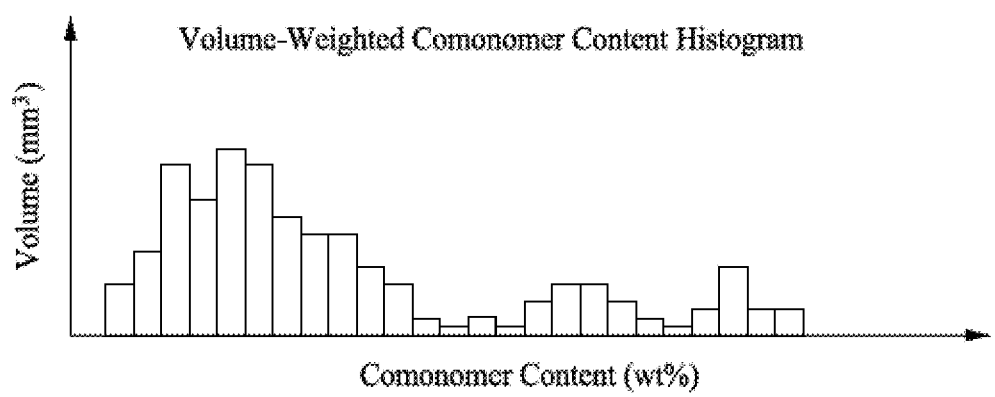
Figure 1:
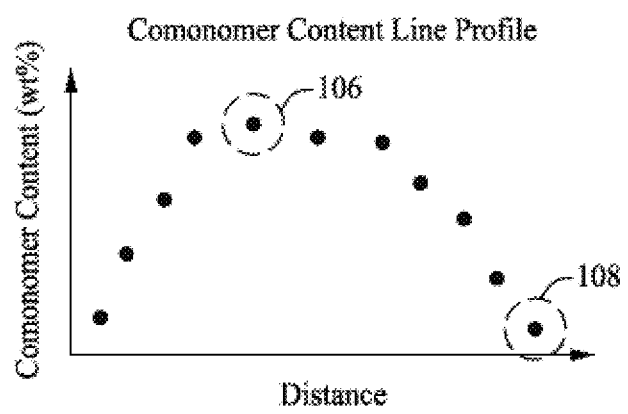

Before the present compounds, components, compositions, and/or methods are disclosed and described, it is to be understood that unless otherwise indicated this invention is not limited to specific compounds, components, compositions, reactants, reaction conditions, ligands, catalyst structures, metallocene structures, or the like, as such may vary, unless otherwise specified. It is also to be understood that the terminology used herein is for the purpose of describing particular embodiments only and is not intended to be limiting.

Conventionally, polyethylene is synthesized with a supported catalyst via gas- or slurry-phase copolymerization of ethylene monomers and a comonomer (e.g., 1-hexene). The product is granules of polyethylene where the polyethylene composition is homogeneous throughout the granule. In contrast, the present disclosure relates to heterogeneous polyethylene granules where the relative concentrations of ethylene and comonomer are different in at least two portions of the as-produced polyethylene granule. The present disclosure further relates to the catalyst systems and single reaction zone methods relating to the production of the heterogeneous polyethylene granules.

Definitions

As used herein, "polymer" may be used to refer to homopolymers, copolymers, terpolymers, etc. As used herein, the term "copolymer" is meant to include polymers having two or more monomers. As used herein, when a polymer is referred to as "comprising" a monomer, the monomer is present in the polymer in the polymerized form of the monomer or in the derivative form of the monomer. Likewise, when catalyst components are described as comprising neutral stable forms of the components, it is well understood by one skilled in the art, that the ionic form of the component is the form that reacts with the monomers to produce polymers.

As used herein, the term "monomer" or "comonomer" can refer to the monomer used to form the polymer (i.e., the unreacted chemical compound in the form prior to polymerization) and can also refer to the monomer after it has been incorporated into the polymer, also referred to herein as a "[monomer]-derived unit". Different monomers are discussed herein including, but not limited to, $C_4$-$C_7$ isoolefin monomers, non-halogenated alkylstyrene monomers, halogenated styrene monomers, and diolefin monomers.

As used herein, the term "polyethylene" refers to a polymer comprising ethylene monomers and optionally $C_4$-$C_{20}$ α-olefin comonomers. For example, polyethylene can consist of ethylene monomers. In another example, polyethylene can consist of 70 wt % to 99 wt % ethylene monomers and 1 wt % to 30 wt % of one or more $C_4$-$C_{20}$ α-olefin comonomers. A specific example is a polyethylene consisting of 70 wt % to 99 wt % ethylene monomers and 1 wt % to 30 wt % 1-hexene comonomers. Preferred α-olefin comonomers include, but are not limited to, propylene, 1-butene, 1-pentene, 1-hexene, 3-methyl-1-pentene, 4-methyl-1-pentene, 1-octene, 1-decene, and 1-dodecene.

As used herein, the term "linear low density polyethylene" ("LLDPE") refers to a transition-metal catalyzed polyethylene (homopolymer or copolymer as described above) having a density from 0.900 g/cm³ to 0.940 g/cm³.

As used herein, the term "heterogeneous polyethylene granules" refers to an as-produced polyethylene granule having at least two portions with different polyethylene compositions.

Figure 2:
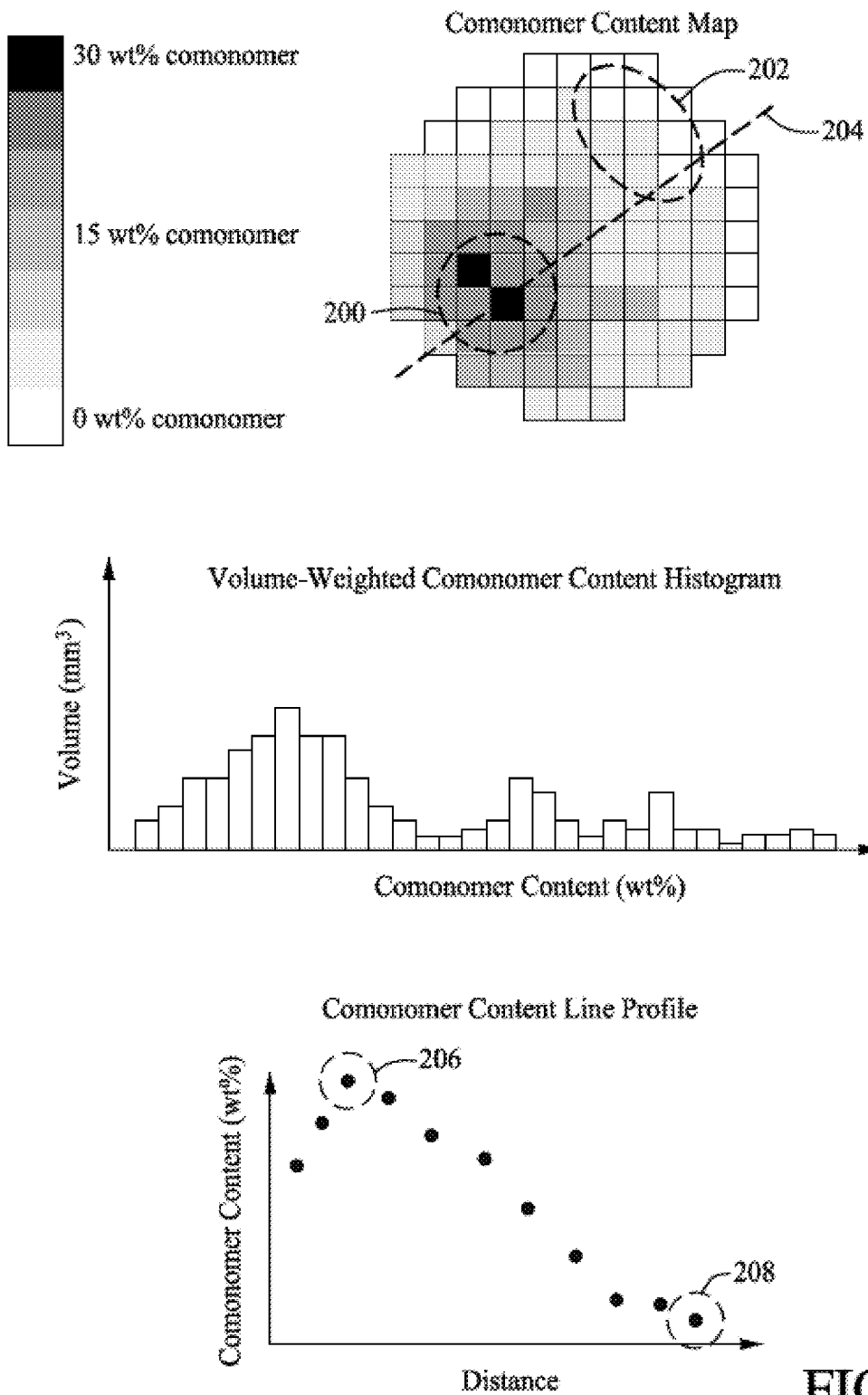
FIG. 2 illustrates another prophetic example of a comonomer content map, volume-weighted comonomer content histogram, and a comonomer content line profile for a heterogeneous polyethylene granule of the present disclosure.

As used herein, the term "portion" relative to a polymer granule refers to 20% of the cross-sectional area, see. FIGS. 1 and 2.

A "catalyst system" is a combination of at least one catalyst compound and a support material. The catalyst system may have at least one activator and/or at least one co-activator. When catalyst systems are described as comprising neutral stable forms of the components, it is well understood that the ionic form of the component is the form that reacts with the monomers to produce polymers. For purposes of the present disclosure, "catalyst system" includes both neutral and ionic forms of the components of a catalyst system.

As used herein, the term "D90" is the diameter at which 90% by volume of the plurality of particles have a diameter less than D90.

As used herein, the term "D50" is the diameter at which 50% by volume of the plurality of particles have a diameter less than D50.

As used herein, the term "D10" is the diameter at which 10% by volume of the plurality of particles have a diameter less than D10.

As used herein, the term "reaction zone," also referred to as a "polymerization zone," is a vessel where polymerization takes place. A batch reactor is an example of a reaction zone. When multiple reactors are used in either series or parallel configuration, each reactor is considered as a separate polymerization zone. For a multi-stage polymerization in both a batch reactor and a continuous reactor, each polymerization stage is considered as a separate polymerization zone.

As used herein, the term "blend" refers to a mixture of two or more polymers. Blends may be produced by, for example, solution blending, melt mixing, or compounding in a shear mixer. Solution blending is common for making adhesive formulations comprising baled butyl rubber, tackifier, and oil. Then, the solution blend is coated on a fabric substrate, and the solvent evaporated to leave the adhesive.

As used herein, the term "Mn" is number average molecular weight.

As used herein, the term "Mw" is weight average molecular weight.

As used herein, the term "Mz" is z average molecular weight

As used herein, the term "molecular weight distribution" (MWD), also referred to as polydispersity index (PDI), is defined to be Mw divided by Mn (i.e., the expression Mw/Mn).

Unless otherwise noted, all molecular weight units (e.g., Mw, Mn, Mz) are g/mol.

As used herein, the term "wt %" is weight percent.

As used herein, the term "mol %" is mole percent.

Heterogeneous Polyethylene Granules

The heterogeneous polyethylene granules of the present disclosure have two or more portions of the as-produced granule with different relative concentrations of ethylene and comonomer. Identifying heterogeneous polyethylene granules can be done using a comonomer content map, a volume-weighted comonomer content histogram, and/or a comonomer content line profile.

To obtain the comonomer content map, a slice having a thickness of 150 microns±50 microns is cut from the central section of the granule and placed between two KBr windows within a compression cell. Fourier transform infrared (FTIR) spectroscopy is then used to measure the wt % of ethylene derived units and comonomer derived units across the cross-sectional slice of the granule. More specifically, an FTIR spectrometer coupled with a continuum microscope having an adjustable aperture is set to a 50 μm×50 μm square. Depending upon the size of the granule and its' domains, the FTIR microscope aperture size can be adjusted to smaller sizes. The aperture (50×50 μm) is rastered across the cross-sectional slice using 50 μm step sizes collecting an FTIR spectrum (60 scans and a data spacing of 0.964 cm$^{-1}$) at each point to produce a spatial comonomer distribution map of the granule. FTIR spectra are then analyzed for comonomer content (short chain branching). For a polyethylene with a 1-butene, 1-hexene, or 1-octene comonomer, ASTM D6645-01(2010) describes the method of determining the comonomer content from an FTIR spectrum in a pressed plaque. Molded polymer plaques are used to create the FTIR comonomer calibration on the Nicolet iS50 bench top spectrometer in transmission mode and then applied to the FTIR microscope spectra. Other known ASTM standards can be used for other comonomers. FTIR microscope spectra are quantified by ratioing the absorbance of the terminal methyl peak at 1378 cm$^{-1}$ by the area of the methylene combination band at 2019 cm$^{-1}$. The absorbance peak height of the 1378 cm$^{-1}$ band is measured after baseline correction with end points determined from the minimum between 1392-1401 cm$^{-1}$ and 1330-1324 cm$^{-1}$. Area of the 2019 cm$^{-1}$ methylene combination band is measured after a baseline correction using end points determined from the minimum between 2130-2080 cm$^{-1}$ and 1990-1965 cm$^{-1}$. The absorbance ratio 1378/2019 cm$^{-1}$ is then used to determine the weight percent hexene from a linear calibration of 1378/2019 cm$^{-1}$ ratio versus comonomer concentration. Once a comonomer content is determined for each point (or pixel) of the cross-sectional slice, a comonomer content map can be produced.

Using the comonomer content map, a volume-weighted histogram of the comonomer content can be produced from the 50×50 μm FTIR absorbance measurements. The 50×50 μm area absorbance measurements are weighted according to the peak area of the 2019 cm$^{-1}$ methylene combination band. A linear correlation between the peak area of the 2019 cm$^{-1}$ methylene combination band and the thickness of molded polyethylene plaques are used to estimate the thickness of the granule within the 50×50 μm FTIR microscope measurement area. Once the approximate thickness of the granule cross-section within the 50×50 μm FTIR microscope aperture is calculated, a volume element for that spatial location on the granule cross-section can be computed. Using the thickness of the granule cross-section and the 50×50 μm aperture size a volume is calculated, which effectively weights the amount of comonomer within the measured point from the comonomer content map. A volume-weighted histogram was then constructed using 0.5 wt % bin sizes and summing the calculated volumes of the FTIR mapped comonomer points from the cross-sectional granule within a particular bin. Moments for the volume-weighted comonomer content histogram can be computed to determine the mean (M1), variance (M2), skewness (M3), and kurtosis (M4) of the distribution.

Using the comonomer content map, a comonomer content line profile can be derived. The comonomer content line profile is a plot of the comonomer content along a line that passes through the center of the comonomer content map and the pixel of the comonomer content map with the highest comonomer content.

FIGS. 1 and 2 illustrate prophetic examples of a comonomer content map, a volume-weighted comonomer content histogram, and a comonomer content line profile for a heterogeneous polyethylene granule of the present disclosure. One or more of the comonomer content map, the volume-weighted comonomer content histogram, and the comonomer content line profile can be used to characterize a heterogeneous polyethylene granule.

In a first example, the comonomer content map can be used to characterized the comonomer distribution where a first polyethylene in a first portion 100, 200 of the granule has a greater comonomer content than a second polyethylene in a second portion 102, 202 of the granule. The comonomer contents over the portions (defined above) are averaged by area to determine the comonomer content for that portion. The portions are not necessarily shaped the same.

For example, the concentration of comonomer derived units (i.e., comonomer content) in a first polyethylene can range from about 10 wt % to about 30 wt % of a first polyethylene, and the concentration of comonomer derived units in a second polyethylene can range from about 2 wt % to about 15 wt % of a second polyethylene. In another example, the concentration of comonomer derived units in the first polyethylene can range from about 13 wt % to about 25 wt % of the first polyethylene, and the concentration of comonomer derived units in the second polyethylene can range from about 3 wt % to about 12 wt % of the second polyethylene. In another example, the concentration of comonomer derived units in the first polyethylene can range from about 11 wt % to about 25 wt % of the first polyethylene, and the concentration of comonomer derived units in the second polyethylene can range from about 2 wt % to about 8 wt % of the second polyethylene. In yet another example, the concentration of comonomer derived units in the first polyethylene can range from about 16 wt % to about 23 wt % of the first polyethylene, and the concentration of comonomer derived units in the second polyethylene can range from about 4 wt % to about 10 wt % of the second polyethylene. Any combination of any upper wt % limit and any lower wt % limit can be used to describe the ranges of comonomer content in the respective first and second portions.

In another example description of the heterogeneous polyethylene granule of the present disclosure, the comonomer content in a first portion of the granule can be about 5 wt % to about 25 wt % greater than the comonomer content in the second portion of the granule. In another example, the comonomer content in a first portion of the granule can be about 10 wt % to about 20 wt % greater than the comonomer content in the second portion of the granule. In yet another example, the comonomer content in a first portion of the granule can be about 12 wt % to about 18 wt % greater than the comonomer content in the second portion of the granule. Any combination of any upper wt % limit and any lower wt % limit can be used to describe the differences in comonomer content between the first and second portions.

A volume-weighted histogram of the FTIR comonomer content map can be used to determine the heterogeneous nature of a granule. To prepare the volume-weighted histogram, each FTIR spectrum from the 50×50 um areas of the comonomer content map is used to calculate the thickness of the granule at each point or pixel from the 2019 cm$^{-1}$ methylene combination band. The 2019 cm$^{-1}$ methylene combination band is used as an internal thickness correction in ASTM D6645-01(2010) and the peak area is correlated to the thickness of polyethylene plaques. Thickness of the granule cross-section is used to calculate the volume of the granule within the 50×50 μm FTIR microscope measurement area. The histogram of the volume-weighted FTIR microscope comonomer map of the granule is then used to determine the moments (M1, M2, M3, and M4) of the granule comonomer distribution. Histograms are created by binning the volume-weighted weight percent comonomer of each point of the FTIR comonomer map into 0.5 wt % bins. A probability is calculated for each weight percent bin by dividing the volume of each weight percent bin of the histogram by the total volume of all the weight percent bins. Once the probabilities of each bin of the volume-weighted histogram are calculated, the first moment of the distribution (M1) is computed using Equation 1.

$$M1 = \Sigma x_i * p(x_i) \qquad \text{Equation 1,}$$

where M1 is the mean of the distribution, $x_i$ is the weight percent of the middle of a bin, and $p(x_i)$ is probability of a particular bin value $x_i$.

Once the first moment of the distribution is calculated the variance (M2), skewness (M3), and kurtosis (M4) of the distribution can be calculated using the Equations 2, 3, and 4, respectively.

$$M2=\Sigma(x_i-M1)^2 * p(x_i) \quad \text{Equation 2,}$$

$$M3=\Sigma(x_i-M1)^3 * p(x_i)/M_2^{3/2} \quad \text{Equation 3,}$$

$$M4=\Sigma(x_i-M1)^4 * p(x_i)/M_2^2 \quad \text{Equation 4,}$$

As an example description of the heterogeneous polyethylene granule of the present disclosure, the volume-weighted comonomer content histogram can have a variance (M2) defined by Equation 2 above of about 2 wt %$^2$ or greater. For example, the volume-weighted comonomer content histogram can have an M2 of about 2 wt %$^2$ to about 30 wt %$^2$. In another example, the volume-weighted comonomer content histogram can have an M2 of about 3 wt %$^2$ to about 20 wt %$^2$. In another example, the volume-weighted comonomer content histogram can have an M2 of about 5 wt %$^2$ to about 15 wt %$^2$. In another example, the volume-weighted comonomer content histogram can have an M2 of about 8 wt %$^2$ to about 11 wt %$^2$.

In another example description of the heterogeneous polyethylene granule of the present disclosure, the comonomer content line profile can be used to describe the heterogeneous polyethylene granule of the present disclosure. More specifically, referring again to FIGS. 1 and 2, the comonomer content line profiles along lines 104, 204 can have a peak comonomer content 106, 206 minus minimum comonomer content 108, 208 from about 5 wt % or greater (e.g., about 5 wt % to about 25 wt %). For example, the comonomer content line profile can have a peak comonomer content minus minimum comonomer content from about 8 wt % to 20 wt %. In another example, the comonomer content line profile can have a peak comonomer content minus minimum comonomer content from about 10 wt % to 18 wt %. Any combination of any upper wt % limit and any lower wt % limit can be used to describe the ranges of peak comonomer content minus minimum comonomer content.

The heterogeneous polyethylene granule of the present disclosure can be characterized by one or more of the foregoing. That is, heterogeneous polyethylene granule of the present disclosure can have one or more of the following: (1) a first portion with a comonomer content from about 10 wt % to about 30 wt % and a second portion with comonomer content from about 2 wt % to about 15 wt % as determined from the comonomer content map where the first portion has a higher comonomer content than the second portion; (2) a first portion that is about 5 wt % to about 25 wt % greater than the comonomer content in a second portion as determined from the comonomer content map; (3) a variance in the volume-weighted comonomer content histogram of about 2 wt %$^2$ or greater; and (4) a peak comonomer content minus a minimum comonomer content in the comonomer content line profile of about 5 wt % or greater. Any combination of subranges for the foregoing characterizations can be used.

In some instances, the comonomer content can be distributed throughout the granule can have a pattern. For example, as illustrated in FIG. 1, a core-shell comonomer distribution can be observed where the center or near-center (or core) of the comonomer content map has a higher comonomer concentration than the outer edges (or shell) of the granule. Whereas, as illustrated in FIG. 2, a core-shell comonomer distribution can be observed where the higher comonomer concentration if found closer to the outer edges (or shell) and off-set from the center or near-center (or core) of the granule.

In the foregoing example, the higher comonomer content in the first polyethylene translates to the first polyethylene having a lower density than the second polyethylene.

In the foregoing example, the higher comonomer content in the first polyethylene translates to the first polyethylene having a lower melting point than the second polyethylene.

The heterogeneous polyethylene granules of the present disclosure can have a particle size distribution D50 of about 300 microns to about 1500 microns, or about 350 microns to about 900 microns, or about 400 microns to about 600 microns.

The heterogeneous polyethylene granules of the present disclosure can have a sphericity of about 0.9 or greater.

Examples of comonomers include, but are not limited to, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbomadiene, 1,5-cyclooctadiene, 1-hydroxy-4-cyclooctene, 1-acetoxy-4-cyclooctene, 5-methylcyclopentene, dicyclopentadiene, norbornene, norbomadiene, substituted derivatives thereof, and isomers thereof. Of these, for producing LLDPE, 1-butene, 1-hexene, or 1-octene comonomers are preferred.

Catalyst System

In the present disclosure, a catalyst system can include the product of the combination of one or more catalysts having a Group 3 through Group 12 metal atom or lanthanide metal atom, at least one activator, and one or more support material compositions.

Catalysts: The catalyst having a Group 3 through Group 12 metal atom or lanthanide metal atom can be a metallocene catalyst.

In at least one embodiment, the present disclosure provides a catalyst system comprising a metal atom. The catalyst compound can be a metallocene catalyst. The metal can be a Group 3 through Group 12 metal atom, such as Group 3 through Group 10 metal atoms, or lanthanide Group atoms. The catalyst compound having a Group 3 through Group 12 metal atom can be monodentate or multidentate, such as bidentate, tridentate, or tetradentate, where a heteroatom of the catalyst, such as phosphorous, oxygen, nitrogen, or sulfur is chelated to the metal atom of the catalyst. Non-limiting examples include bis(phenolate)s. In at least one embodiment, the Group 3 through Group 12 metal atom is selected from Group 4, Group 5, Group 6, Group 8, or Group 10 metal atoms. In at least one embodiment, a Group 3 through Group 10 metal atom is selected from Cr, Sc, Ti, Zr, Hf, V, Nb, Ta, Mn, Re, Fe, Ru, Os, Co, Rh, Ir, and Ni. In at least one embodiment, a metal atom is selected from Groups 4, 5, and 6 metal atoms. In at least one embodiment, a metal atom is a Group 4 metal atom selected from Ti, Zr, or Hf. The oxidation state of the metal atom can range from 0 to +7, for example +1, +2, +3, +4, or +5, for example +2, +3, or +4.

Metallocene catalysts as used herein include metallocenes comprising Group 3 to Group 12 metal complexes, preferably, Group 4 to Group 6 metal complexes, for example, Group 4 metal complexes. The metallocene catalyst compound of catalyst systems of the present disclosure may be unbridged metallocene catalyst compounds represented by the formula: $Cp^A Cp^B M'X'_n$, wherein each $Cp^A$ and $Cp^B$ is independently selected from cyclopentadienyl ligands and ligands isolobal to cyclopentadienyl, one or both $Cp^A$ and $Cp^B$ may contain heteroatoms, and one or both $Cp^A$ and $Cp^B$ may be substituted by one or more R" groups. M' is selected from Groups 3 through 12 atoms and lanthanide Group atoms. X' is an anionic leaving group. n is 0 or an integer from 1 to 4. R" is selected from alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, germanium, ether, and thioether.

In at least one embodiment, each $Cp^A$ and $Cp^B$ is independently selected from cyclopentadienyl, indenyl, fluorenyl, cyclopentaphenanthreneyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, and hydrogenated versions thereof.

The metallocene catalyst compound may be a bridged metallocene catalyst compound represented by the formula: $Cp^A(A)Cp^BM'X'n$, wherein each $Cp^A$ and $Cp^B$ is independently selected from cyclopentadienyl ligands and ligands isolobal to cyclopentadienyl. One or both $Cp^A$ and $Cp^B$ may contain heteroatoms, and one or both $Cp^A$ and $Cp^B$ may be substituted by one or more R" groups. M' is selected from Groups 3 through 12 atoms and lanthanide Group atoms. X' is an anionic leaving group. n is 0 or an integer from 1 to 4. (A) is selected from divalent alkyl, divalent lower alkyl, divalent substituted alkyl, divalent heteroalkyl, divalent alkenyl, divalent lower alkenyl, divalent substituted alkenyl, divalent heteroalkenyl, divalent alkynyl, divalent lower alkynyl, divalent substituted alkynyl, divalent heteroalkynyl, divalent alkoxy, divalent lower alkoxy, divalent aryloxy, divalent alkylthio, divalent lower alkylthio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent lower hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether. R" is selected from alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, germanium, ether, and thioether.

In at least one embodiment, each of $Cp^A$ and $Cp^B$ is independently selected from cyclopentadienyl, n-propylcyclopentadienyl, indenyl, pentamethylcyclopentadienyl, tetramethylcyclopentadienyl, and n-butylcyclopentadienyl.

(A) may be O, S, NR', or SiR'2, where each R' is independently hydrogen or $C_1$-$C_{20}$ hydrocarbyl.

In another embodiment, the metallocene catalyst compound is represented by the formula: $T_yCp_mMG_nX_q$, where Cp is independently a substituted or unsubstituted cyclopentadienyl ligand or substituted or unsubstituted ligand isolobal to cyclopentadienyl; M is a Group 4 transition metal; G is a heteroatom group represented by the formula JR*z where J is N, P, O, or S, and R* is a linear, branched, or cyclic $C_1$-$C_{20}$ hydrocarbyl; z is 1 or 2; T is a bridging group; y is 0 or 1; X is a leaving group; m=1; n=1, 2, or 3; q=0, 1, 2, or 3; and the sum of m+n+q is equal to the oxidation state of the transition metal.

In at least one embodiment, J is N, and R* is methyl, ethyl, propyl, butyl, pentyl, hexyl, heptyl, octyl, nonyl, cyclooctyl, cyclododecyl, decyl, undecyl, dodecyl, adamantyl or an isomer thereof.

The metallocene catalyst compound may be selected from: dimethylsilylbis(tetrahydroindenyl)M(R)2; dimethylsilyl(tetramethylcyclopentadienyl)(cyclododecylamido)M(R)2; dimethylsilyl (tetramethylcyclopentadienyl)(cyclododecylamido)M(R)2; dimethylsilyl (tetramethylcyclopentadienyl)(t-butylamido)M(R)2; dimethylsilyl (tetramethylcyclopentadienyl)(t-butylamido)M(R)2; bis(1-butyl,3-methylcyclopentadienyl)M(R)2; bis(n-propylcyclopentadienyl)M(R)2; ethylenebis(indenyl)M(R)2; rac-dimethylsilylbis(trimethylsilylmethylenecyclopentadienyl)M(R)2; μ-$(CH_3)_2$Si(cyclopentadienyl)(1-adamantylamido)M(R)$_2$; μ-$(CH_3)_2$Si(3-tertbutylcyclopentadienyl)(1-adamantylamido)M(R)$_2$; μ-$(CH_3)_2$(tetramethylcyclopentadienyl)(1-adamantylamido)M(R)$_2$; μ-$(CH_3)_2$Si(tetramethylcyclopentadienyl)(1-adamantylamido)M(R)$_2$; μ-$(CH_3)_2$C(tetramethylcyclopentadienyl)(1-adamantylamido)M(R)$_2$; μ-$(CH_3)_2$Si(tetramethylcyclopentadienyl)(1-tertbutylamido)M(R)$_2$; μ-$(CH_3)_2$Si(fluorenyl)(1-tertbutylamido)M(R)$_2$; μ-$(CH_3)_2$Si(tetramethylcyclopentadienyl)(1-cyclododecylamido)M(R)$_2$; μ-$(C_6H_5)_2$C(tetramethylcyclopentadienyl)(1-cyclododecylamido)M(R)$_2$; μ-$(CH_3)_2$Si($\eta^5$-2,6,6-trimethyl-1,5,6,7-tetrahydro-s-indacen-1-yl)(tertbutylamido)M(R)$_2$; where M is selected from Ti, Zr, and Hf; and R is selected from halogen or $C_1$ to $C_5$ alkyl.

Preferred catalysts include: bis(1-butyl,3-methylcyclopentadienyl)zirconium dichloride; bis(n-propylcyclopentadienyl) hafnium dimethyl; and rac-dimethylsilylbis(trimethylsilylmethylenecyclopentadienide)hafnium dimethyl.

In at least one embodiment, the catalyst compound having a Group 3 through Group 12 metal atom or lanthanide metal atom is a bis(phenolate) catalyst compound represented by Formula 1.

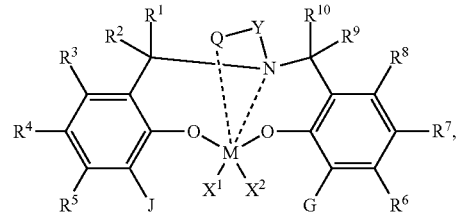

Formula 1 where M is a Group 4 metal; $X^1$ and $X^2$ are independently a univalent $C_1$-$C_{20}$ hydrocarbyl, $C_1$-$C_{20}$ substituted hydrocarbyl, a heteroatom or a heteroatom-containing group, or $X^1$ and $X^2$ join together to form a $C_4$-$C_{62}$ cyclic or polycyclic ring structure; $R^1$, $R^2$, $R^3$, $R^4$, $R^5$, $R^6$, $R^7$, $R^8$, $R^9$, and $R^{10}$ is independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, or $R^{10}$ are joined together to form a $C_4$-$C_{62}$ cyclic or polycyclic ring structure, or a combination thereof; Q is a neutral donor group; J is heterocycle, a substituted or unsubstituted $C_7$-$C_{60}$ fused polycyclic group, where at least one ring is aromatic and where at least one ring, which may or may not be aromatic, has at least five ring atoms; G is as defined for J or may be hydrogen, $C_2$-$C_{60}$ hydrocarbyl, $C_1$-$C_{60}$ substituted hydrocarbyl, or may independently form a $C_4$-$C_{60}$ cyclic or polycyclic ring structure with $R^6$, $R^7$, or $R^8$ or a combination thereof; Y is divalent $C_1$-$C_{20}$ hydrocarbyl or divalent $C_1$-$C_{20}$ substituted hydrocarbyl or (-Q*-Y—) together form a heterocycle; and heterocycle may be aromatic and/or may have multiple fused rings.

In at least one embodiment, the first catalyst compound can be represented by Formula 2 or Formula 3.

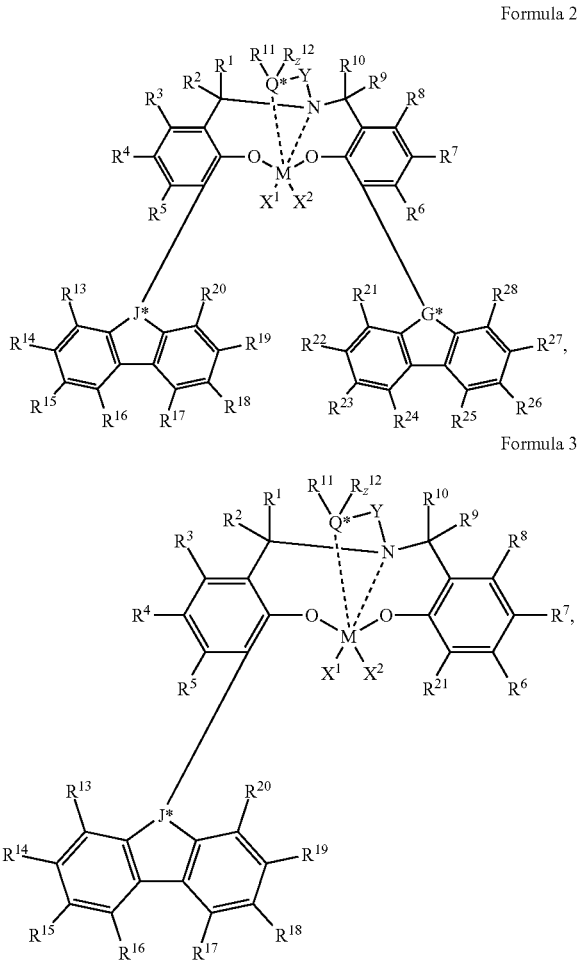

where M is Hf, Zr, or Ti; $X^1$, $X^2$, $R^1$, $R^2$, $R^3$, $R^4$, $R^5$, $R^6$, $R^7$, R, $R^9$, $R^{10}$, and Y are as defined for Formula 1; $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ is independently a hydrogen, $C_1$-$C_{40}$ hydrocarbyl, $C_1$-$C_{40}$ substituted hydrocarbyl, a functional group comprising elements from Groups 13 to 17, or two or more of $R^1$, $R^2$, $R^3$, $R^4$, $R^5$, $R^6$, $R^7$, $R^8$, $R^9$, $R^{10}$ $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ may independently join together to form a $C_4$-$C_{62}$ cyclic or polycyclic ring structure, or a combination thereof; $R^{11}$ and $R^{12}$ may join together to form a five- to eight-membered heterocycle; Q* is a group 15 or 16 atom; z is 0 or 1; J* is CR" or N, and G* is CR" or N, where R" is $C_1$-$C_{20}$ hydrocarbyl or carbonyl-containing $C_1$-$C_{20}$ hydrocarbyl; and z=0 if Q* is a group 16 atom and z=1 if Q* is a group 15 atom.

In at least one embodiment, the first catalyst compound can be represented by Formula 4 is:

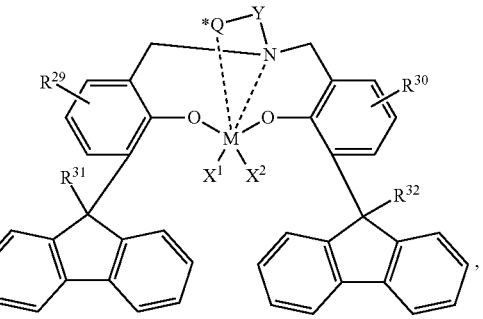

where Y is a divalent $C_1$-$C_3$ hydrocarbyl; Q* is $NR_2$, OR, SR, $PR_2$, where R is as defined for $R^1$ represented by Formula 1; M is Zr, Hf, or Ti; $X^1$ and $X^2$ is independently as defined for Formula 1; $R^{29}$ and $R^{30}$ is independently $C_1$-$C_{40}$ hydrocarbyl; and $R^{31}$ and $R^{32}$ are independently linear $C_1$-$C_{20}$ hydrocarbyl, benzyl, or tolyl.

Catalyst systems of the present disclosure may include a second catalyst compound having a chemical structure different than the first catalyst compound of the catalyst system, for example, two different metallocene catalysts. For purposes of the present disclosure one catalyst compound is considered different from another if they differ by at least one atom. For example "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes of this disclosure (e.g., rac-dimethylsilylbis(2-methyl 4-phenyl)hafnium dimethyl is considered to be the same as meso-dimethylsilylbis(2-methyl 4-phenyl)hafnium dimethyl).

In at least one embodiment, two or more different catalyst compounds are present in the catalyst system used herein. In at least one embodiment, two or more different catalyst compounds are present in the reaction zone where the process(es) described herein occur. When two transition metal catalysts are used in one reactor as a mixed catalyst system, the two transition metal compounds are preferably chosen such that the two are compatible. Any suitable screening method, such as by $^1$H or $^{13}$C NMR, can be used to determine which transition metal compounds are compatible. It is preferable to use the same activator for the transition metal compounds, however, two different activators, such as a non-coordinating anion activator and an alumoxane, can be used in combination. If one or more transition metal compounds contain an $X^1$ or $X^2$ ligand which is not a hydride, hydrocarbyl, or substituted hydrocarbyl, then the alumoxane should be contacted with the transition metal compounds prior to addition of the non-coordinating anion activator.

The first catalyst compound and the second catalyst compound may be used in any ratio (A:B). The first catalyst compound may be (A) if the second catalyst compound is (B).

Alternatively, the first catalyst compound may be (B) if the second catalyst compound is (A). Preferred molar ratios of (A) transition metal compound to (B) transition metal compound fall within the range of (A:B) about 1:1000 to about 1000:1, such as from about 1:100 to about 500:1, such as from about 1:10 to about 200:1, such as from about 1:1 to about 100:1, and alternatively 1:1 to 75:1, and alternatively 5:1 to 50:1. The particular ratio chosen will depend on the exact catalysts chosen, the method of activation, and the end product desired. In a particular embodiment, when using the two catalyst compounds, where both are activated with the same activator, useful mole percent, based upon the molecular weight of the catalyst compounds, are from about 10 to about 99.9% of (A) to about 0.1 to about 90% of (B), such as from about 25 to about 99% (A) to about 0.5 to about 50% (B), such as from about 50 to about 99% (A) to about 1 to about 25% (B), such as from about 75 to about 99% (A) to about 1 to about 10% (B).

Activators: Catalyst systems of the present disclosure can include at least one activator. The activator can be an alkylalumoxane, such as methylalumoxane.

Conventional catalyst systems often contain a molar ratio of metal to catalyst compound metal of greater than 100:1. It has been discovered that a catalyst system having a support material composition having a macroporosity from about 0.15 cc/g to about 0.5 cc/g provides catalyst system compositions having reduced activator content, as compared to conventional catalyst systems. For example, an activator, such as an alkylalumoxane, can be present in a catalyst system of the present disclosure at a molar ratio of metal (such as aluminum) to catalyst compound metal of about 100:1 or less, such as about 50:1 or less.

Alternatively, a molar ratio of metal (such as aluminum) to catalyst compound metal is from about 50:1 to about 200:1, such as about 100:1. The catalyst systems may be formed by combining the above catalysts with activators in any suitable manner including by supporting them for use in slurry or gas phase polymerization. Activators are defined to be any compound which can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal compound cationic and providing a charge-balancing non-coordinating or weakly coordinating anion.

Alumoxane Activators: Alumoxane activators are utilized as activators in the catalyst systems described herein. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane, and isobutylalumoxane. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate ranges include from 1:1 to 500:1, alternately from 1:1 to 200:1, alternately from 1:1 to 100:1, or alternately from 1:1 to 50:1.

Ionizing/Non Coordinating Anion Activators: The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with the present disclosure are those that are compatible, stabilize the transition metal cation in the sense of balancing its ionic charge at +1, and yet retain sufficient lability to permit displacement during polymerization. Ionizing activators useful herein typically comprise an NCA, particularly a compatible NCA.

It is within the scope of the present disclosure to use an ionizing activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of the present disclosure to use neutral or ionic activators alone or in combination with alumoxane or modified alumoxane activators. For descriptions of useful activators please see U.S. Pat. Nos. 8,658,556 and 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4$—]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl) borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-10 (2,3,4,6-tetrafluorophenyl)borate, trialkylammonium tetrakis(perfluoronaphthyl)borate, N,N-dialkylanilinium tetrakis (perfluoronaphthyl)borate, trialkylammonium tetrakis(perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

Support Material Compositions: The support material composition can be an inert support material that is porous. Examples of support materials include, but are not limited to, talc; metal oxides; zeolites; clays; organoclays; and combinations thereof. Examples of metal oxides include, but are not limited to, silica, alumina, magnesia, titania, zirconia, and the line, and combinations thereof. Examples of clays include, but are not limited to, montmorillonite, phyllosilicate, and combinations thereof. Examples of combination support materials include, but are not limited to, silica-chromium, silica-alumina, and silica-titania.

The support material may be fluoride. As used herein, the phrases "fluorided support" and "fluorided support composition" mean a support, desirably particulate and porous, which has been treated with at least one inorganic fluorine containing compound. For example, the fluorided support composition can be a silicon dioxide support wherein a portion of the silica hydroxyl groups has been replaced with fluorine or fluorine containing compounds. Suitable fluorine containing compounds include, but are not limited to, inorganic fluorine containing compounds and/or organic fluorine containing compounds.

It is preferred that the support material, most preferably an inorganic oxide, has a surface area between about 10 $m^2/g$ and about 900 $m^2/g$, pore volume between about 0.1 cc/g and about 4.0 cc/g and average particle size between about 5 μm and about 500 μm. In at least one embodiment, the surface area of the support material is between about 50 $m^2/g$ and about 500 $m^2/g$, pore volume between about 0.5 cc/g and about 3.5 cc/g and average particle size between about 10 μm and about 200 μm. The surface area of the support material may be between about 100 $m^2/g$ and about 400 $m^2/g$, pore volume between about 0.8 cc/g and about 3.0 cc/g and average particle size between about 5 μm and about 100 μm. The average pore size of the support material may be between about 10 Å and about 1000 Å, such as between about 50 Å and about 500 Å, such as between about 75 Å and about 350 Å. In at least one embodiment, the support material is a low surface area, amorphous silica (e.g., surface area=300 $m^2/gm$; pore volume of 1.65 $cm^3/gm$). Non-limiting example silicas are marketed under the trade names of DAVISON 952, DAVISON 948, or DAVISON 955 by the Davison Chemical Division of W.R. Grace and Company, Siral-40 by Sasol, DM-L-403, DM-L-302, DM-L-303, DM-L-503, DM-M-302, DM-M-402 by Asahi Glass Co., Ltd., and ES-70, ES-757 by PQ Corporation.

A support material composition of the present disclosure has a volume percent of pores with a pore size of from 300 Å up to 1500 Å of 10 vol % to 80 vol %. Such support materials can be obtained commercially from, for example, Asahi Glass Co., Ltd. or AGC Chemicals Americas. In some instances, these support materials can also have a BET surface area of less than 700 $m^2/g$.

A catalyst system with a support material composition having a volume percent of pores with a pore size of from 300 angstroms up to 1500 angstroms of 10 vol % to 80 vol % provides catalyst systems having increased catalyst content uniformly distributed throughout the support material particles and provides for one or more of a high productivity, high bulk density polymer, and reduced sheeting and chunking within a reactor during polymerization.

The support material composition can be made of a plurality of particles. One or more of the plurality of particles can have a surface area from about 10 $m^2/g$ to about 900 $m^2/g$, pore volume (mesoporosity) from about 0.1 to about 4.0 cc/g and average particle size from about 5 microns (μm) to about 500 μm. In at least one embodiment, the surface area of one or more of the plurality of particles is from about 100 $m^2/g$ to about less than 700 $m^2/g$, pore volume from about 0.5 cc/g to about 3.5 cc/g, and average particle size from about 10 μm to about 200 μm.

The surface area of one or more of the plurality of particles may be from about 200 to about 600 $m^2/g$, pore volume from about 1.0 to about 2.5 cc/g and average particle size from about 5 to about 100 μm.

The average pore size (diameter) of one or more of the plurality of particles may be from about 15 to about 1500 Å, such as from about 50 to about 1250 Å, such as from about 75 to about 1000 Å. In at least one embodiment, one or more of the plurality of particles is a low surface area, amorphous silica (surface area=328 $m^2/gm$; pore volume of 2.2 $cm^3/gm$).

Non-limiting example silicas are marketed under the trade names of DM-L-403, DM-L-302, DM-L-503, DM-M-302, and H-202-F available from AGC Chemicals Americas.

In at least one embodiment, one or more of the plurality of particles has a surface area from about 270 $m^2/g$ to about 350 $m^2/g$ and a pore volume from about 1.2 cc/g to about 2.3 cc/g. In at least one embodiment, one or more of the plurality of particles has a surface area from about 300 $m^2/g$ to about 680 $m^2/g$ and a pore volume from about 1.2 cc/g to about 2.5 cc/g.

One or more of the plurality of particles has a volume size diameter from about 1 to about 300 microns. The term diameter is used to refer to the particle size as measured by light scattering, though it is not meant to imply that the particles are necessarily spherical in-shape. The volume size diameter is also referred to as the volume moment mean of the particles, or $D[4,3]=\Sigma n_i d_i^4/\Sigma n_i d_i^3$ summed over all particles i.

Volume size diameter may be measured by particle size analysis via light scattering using an apparatus such as a MALVERN™ Mastersizer. This instrument, made by Malvern Instruments, Malvern, Worcestershire, utilizes Mie theory to calculate the particle size distribution. Mie theory predicts how light is scattered by spherical particles and takes into account the refractive index of the particles. The real value used for silica refractive index is 1.45 and 0.1 is used for the imaginary refractive index of the particle (corresponding to the absorption of light), with a water dispersant at 1.33 refractive index.

When considering the particle size distribution, as opposed to the mean particle size, the plurality of particles suitably has a D90 of about 5000 μm or less, such as about 400 or less. They may have a D50 of about 50 μm or less. The plurality of particles may have D10 of about m or less, such as about 1 μm or less. Furthermore, the support material composition can have a particle size D50 value of from about 10 μm to about 400 microns, such as from about 30 microns to about 100 microns, such as from about 30 microns to about 60 microns. In at least one embodiment, the support material composition has a particle size diameter D50 value of about 40 microns.

In at least one embodiment, the support material particles have a sphericity of at least 0.970. In general, the higher the sphericity of the support material particle, the higher the bulk density of the resulting polymer. The sphericity (SPHT) is defined as SPHT=$4\pi A/U^2$, where A is the cross-sectional area and U is the cross-sectional circumference of the polymer particles. The mean sphericity is the volume-average sphericity. The mean sphericity can be determined, for example, with the CAMSIZER® image analysis system (Retsch Technology GmbH; Haan; Germany). For the measurement, the product is introduced through a funnel and conveyed to the falling shaft with a metering channel. While the particles fall past a light wall, they are recorded selectively by a camera. The images recorded are evaluated by the software in accordance with the parameters selected. To characterize the roundness, the parameters designated as sphericity in the program are employed. The parameters reported are the mean volume-weighted sphericities, the volume of the particles being determined via the equivalent diameter xcmin. To determine the equivalent diameter xcmin, the longest chord diameter for a total of 32 different spatial directions is measured in each case. The equivalent diameter xcmin is the shortest of these 32 chord diameters. To record the particles, the so-called CCD-zoom camera (CAM-Z) is used. To control the metering channel, a surface coverage fraction in the detection window of the camera (transmission) of 0.5% is predefined.

In at least one embodiment, the support material particles are an inert support material. The support material particles may be a porous support material, for example, talc or inorganic oxides. Other support materials include zeolites, clays, organoclays, or any other organic or inorganic support material and the like, or mixtures thereof.

In at least one embodiment, the support material particles are an inorganic oxide in a finely divided form. Suitable inorganic oxide materials for use as support material particles herein include Groups 2, 4, 13, and 14 metal oxides, such as silica, alumina, silica-alumina, and mixtures thereof. Other inorganic oxides that may be employed either alone or in combination with the silica, or alumina are magnesia, titania, zirconia, and the like. Other suitable support material particles, however, can be employed, for example, finely divided functionalized polyolefins, such as finely divided polyethylene. Particularly useful support material particles include magnesia, titania, zirconia, montmorillonite, phyllosilicate, zeolites, talc, clays, and the like. Also, combinations of these support material particles may be used, for example, silica-chromium, silica-alumina, silica-titania, and the like. In at least one embodiment, the support material particles are selected from $Al_2O_3$, $ZrO_2$, $SiO_2$, $SiO_2/Al_2O_2$, silica clay, silicon oxide/clay, or mixtures thereof.

The support material particles may include fluorine, e.g. the support material may be fluorided. As used herein, the phrases "fluorided support material particle," "fluorided support," and "fluorided support material composition" mean a support, desirably particulate and porous, which has been treated with at least one inorganic fluorine containing compound. For example, the fluorided support composition particles can be silicon dioxide support particles where a portion of the silica hydroxyl groups has been replaced with fluorine or fluorine containing compounds. Suitable fluorine containing compounds include, but are not limited to, inorganic fluorine containing compounds and/or organic fluorine containing compounds.

Fluorine compounds suitable for providing fluorine for the support may be organic or inorganic fluorine compounds and are desirably inorganic fluorine containing compounds. Such inorganic fluorine containing compounds may be any compound containing a fluorine atom as long as it does not contain a carbon atom. Particularly desirable are inorganic fluorine containing compounds selected from $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$, $NH_4HF_2$, and combinations thereof. In at least one embodiment, ammonium hexafluorosilicate and ammonium tetrafluoroborate are used.

The plurality of particles can be coupled, adhered, or otherwise suitably interacted with each other to form a support material composition. A support material composition can be an agglomerate of these support material particles.

The support material composition should be dry, that is, free or substantially free of absorbed water. Drying of the support material composition can be effected by heating or calcining at from about 100° C. to about 1000° C., such as at least about 600° C. When the support material composition is silica, it is heated to at least 200° C., such as from about 200° C. to about 850° C., such as about 600° C.; and for a time from about 1 minute to about 100 hours, from about 12 hours to about 72 hours, or from about 24 hours to about 60 hours. The calcined support material composition can have at least some reactive hydroxyl (OH) groups.

A support material composition is then contacted with at least one polymerization catalyst and an activator. The support material composition, having reactive surface groups, typically hydroxyl groups, is slurried in a non-polar solvent and the resulting slurry is contacted with a solution of at least one catalyst compound and an activator. In at least one embodiment, the slurry of the support material composition is first contacted with the activator for a period of time from about 0.5 hours to about 24 hours, such as from about 2 hours to about 16 hours, or from about 4 hours to about 8 hours. The solution of the catalyst compound is then contacted with the isolated support material composition/activator. In at least one embodiment, the supported catalyst system is generated in situ. In at least one embodiment, the slurry of the support material composition is first contacted with the catalyst compound for a period of time from about 0.5 hours to about 24 hours, such as from about 2 hours to about 16 hours, or from about 4 hours to about 8 hours. The slurry of the supported catalyst compound(s) is then contacted with the activator solution.

The mixture of the catalyst, activator and support material composition may be heated to from about 0° C. to about 110° C., such as from about 23° C. to about 60° C., for example, room temperature. Contact times may be from about 0.5 hours to about 24 hours, such as from about 2 hours to about 16 hours, or from about 4 hours to about 8 hours.

Suitable non-polar solvents are materials in which all of the reactants used herein (e.g., the activator and the catalyst compound) are at least partially soluble and which are liquid at reaction temperatures. Non-limiting example non-polar solvents are alkanes, such as isopentane, hexane, n-heptane, octane, nonane, and decane, cycloalkanes, such as cyclohexane, aromatics, such as benzene, toluene, and ethylbenzene.

Optional Scavengers or Co-Activators: In addition to these activator compounds, catalyst systems of the present disclosure may include scavengers or co-activators. Scavengers or co-activators include aluminum alkyl or organo-aluminum compounds, for example, trimethylaluminum, triethylaluminum, triisobutylaluminum, tri-n-hexylaluminum, tri-n-octylaluminum, and diethyl zinc.

Reaction Conditions

It has also been discovered that a catalyst system having a support material composition having a macroporosity from about 0.15 cc/g to about 0.5 cc/g provides reduced sheeting and chunking within a reactor during polymerization.

Sheeting and chunking during polymerization can be monitored by the temperature of the wall (measured with a thermocouple either on or just penetrating the reactor wall, known as a "skin TC") within a reactor. When polymer granules lose mobility near the reactor wall, the reactor is in danger of sheeting or chunking. Skin temperature can decrease, as monitored by a thermocouple on or within the reactor, because a solid insulating layer of polymer is formed on the walls of the reactor. This decrease in temperature of the skin is typically referred to as a "cold-band." Without being bound by theory, cold-bands form when non-reactive granules are suspended near the wall by a dangerous level of static charges. If sheets form on the walls of the reactor, the reactor is typically shut down and cleaned, which increases polymer formation time and financial cost.

An increase in reactor skin temperature is also possible. An increase in reactor skin temperature is known as a positive skin thermocouple deviation. These deviations are typically the result of these same static charges immobilizing reacting granules, which heat above their melting point due to the exothermic polymerization reaction, then stick together to form sheets or chunks. Eventually a solid strip of polymer, called a "sheet," is formed and dislodged to the main body of the reactor resulting in a decrease in operability. In many cases, several hours to days of a reactor shut down are involved to remove the sheets before restarting the polymerization process.

Embodiments of the present disclosure reduce or eliminate cold-bands and/or positive skin thermocouple deviations during polyethylene polymerization thereby reducing or eliminating the occurrence of sheeting and/or chunking within the reactor.

In at least one embodiment of the present disclosure, a process includes polymerizing olefins to produce a polyethylene composition by contacting at least one olefin with a catalyst system of the present disclosure and obtaining the polyethylene composition.

Polymerization may be conducted at a temperature of from about 0° C. to about 300° C., at a pressure in the range of from about 0.35 MPa to about 10 MPa, and/or at a time up to about 300 minutes.

Embodiments of the present disclosure include polymerization processes where ethylene and comonomer, are contacted with a catalyst system comprising at least one catalyst compound and an activator, as described above. The at least one catalyst compound and activator may be combined in any order, and are combined typically prior to contact with the monomer.

Comonomers useful herein include, but are not limited to, substituted or unsubstituted $C_3$ to $C_{40}$ alpha olefins, preferably $C_3$ to $C_{20}$ alpha olefins, preferably $C_3$ to $C_{12}$ alpha olefins, preferably propylene, butene, pentene, hexene, heptene, octene, nonene, decene, undecene, dodecene and isomers thereof. The $C_3$ to $C_{40}$ olefin monomers may be linear, branched, or cyclic. The $C_3$ to $C_{40}$ cyclic olefins may be strained or unstrained, monocyclic or polycyclic, and may include heteroatoms and/or one or more functional groups.

Exemplary $C_3$ to $C_{40}$ olefin comonomers include, but are not limited to, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and substituted derivatives thereof, preferably norbornene, norbornadiene, and dicyclopentadiene.

In at least one embodiment, one or more dienes are present in a polymer produced herein at up to about 10 wt %, such as from about 0.00001 to about 1.0 wt %, such as from about 0.002 to about 0.5 wt %, such as from about 0.003 to about 0.2 wt %, based upon the total weight of the composition. In at least one embodiment, about 500 ppm or less of diene is added to the polymerization, such as about 400 ppm or less, such as about 300 ppm or less. In at least one embodiment, at least about 50 ppm of diene is added to the polymerization, or about 100 ppm or more, or 150 ppm or more. Diolefin monomers include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). In at least one embodiment, the diolefin monomers are linear di-vinyl monomers, such as those containing from 4 to 30 carbon atoms. Non-limiting examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Non-limiting example cyclic dienes include cyclopentadiene, vinylnorbornene, norbornadiene, ethylidene norbornene, divinylbenzene, dicyclopentadiene or higher ring containing diolefins with or without substituents at various ring positions.

In at least one embodiment, where butene is the comonomer, the butene source may be a mixed butene stream comprising various isomers of butene. The 1-butene monomers are expected to be preferentially consumed by the polymerization process as compared to other butene monomers. Use of such mixed butene streams will provide an economic benefit, as these mixed streams are often waste streams from refining processes, for example, $C_4$ raffinate streams, and can therefore be substantially less expensive than pure 1-butene.

Polymerization processes of the present disclosure can be carried out in any suitable manner. Any suitable suspension, homogeneous, bulk, solution, slurry, and/or gas phase polymerization process can be used. Such processes can be run in a batch, semi-batch, or continuous mode. Homogeneous polymerization processes and slurry processes are preferred. (A homogeneous polymerization process is defined to be a process where at least about 90 wt % of the product is soluble in the reaction media.) A bulk homogeneous process is particularly preferred. (A bulk process is defined to be a process where monomer concentration in all feeds to the reactor is 70 vol % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein, the term "slurry polymerization process" means a polymerization process where a supported catalyst is used and monomers are polymerized on the supported catalyst particles. At least 95 wt % of polymer products derived from the supported catalyst are in granular form as solid particles (not dissolved in the diluent). Processes of the present disclosure may include introducing the catalyst system into a reactor as a slurry. Disclosure may include introducing the catalyst system into a reactor as a slurry.

Suitable diluents/solvents for polymerization include non-coordinating, inert liquids. Non-limiting examples include straight and branched-chain hydrocarbons, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$ to $C_{10}$ alkanes, chlorobenzene, and aromatic and alkylsubstituted aromatic compounds, such as benzene, toluene, mesitylene, and xylene. Suitable solvents also include liquid olefins which may act as monomers or comonomers including, but not limited to, ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexane, isohexane, heptane, octane, dodecane, or mixtures thereof; cyclic and alicyclic hydrocarbons, such as cyclohexane, cycloheptane, methylcyclohexane, methylcycloheptane, or mixtures thereof. In another embodiment, the solvent is not aromatic, and aromatics are present in the solvent at less than about 1 wt %, such as less than about 0.5 wt %, such as about 0 wt % based upon the weight of the solvents.

In at least one embodiment, the feed concentration of the monomers and comonomers for the polymerization is about 60 vol % solvent or less, preferably about 40 vol % or less, or about 20 vol % or less, based on the total volume of the feedstream. Preferably, the polymerization is run in a bulk process.

Preferred polymerizations can be run at any temperature and/or pressure suitable to obtain the heterogeneous polyethylene granules. Typical temperatures and/or pressures include a temperature from about 0° C. to about 300° C., such as from about 20° C. to about 200° C., such as from about 35° C. to about 150° C., such as from about 40° C. to about 120° C., such as from about 65° C. to about 95° C.; such as from about 25° C. to about 100° C., such as from about 50° C. to about 90° C., such as from about 50° C. to about 80° C., and at a pressure from about 0.35 MPa to about 10 MPa, such as from about 0.45 MPa to about 6 MPa, or preferably from about 0.5 MPa to about 4 MPa.

In a typical polymerization, the run time of the reaction is up to about 500 minutes, such as from about 5 to about 300 minutes, such as from about 30 to about 250 minutes.

Hydrogen, may be added to a reactor for molecular weight control of polyethylene. In at least one embodiment, hydrogen is present in the polymerization reactor at a partial pressure of from about 0.001 and 50 psig (0.007 to 345 kPa), such as from about 0.01 to about 25 psig (0.07 to 172 kPa), such as from about 0.1 and 10 psig (0.7 to 70 kPa). In one embodiment, 1500 ppm or less of hydrogen is added, or 1000 ppm or less of hydrogen is added, or 400 ppm or less or 300 ppm or less. In other embodiments, at least 50 ppm of hydrogen is added, or 100 ppm or more, or 150 ppm or more.

In an alternative embodiment, the activity of the catalyst is at least about 50 g/mmol/hour, such as about 500 or more g/mmol/hour, such as about 5,000 or more g/mmol/hr, such as about 50,000 or more g/mmol/hr. In an alternative embodiment, the conversion of olefin monomer is at least about 10%, based upon polymer yield (weight) and the weight of the monomer entering the reaction zone, such as about 20% or more, such as about 30% or more, such as about 50% or more, such as about 80% or more.

Space time yield (STY) is the weight of polymer produced per hour of reaction per unit volume of reactor. In at least one embodiment, the space time yield is about 10 lb/hr/ft$^3$ or greater, such as about 12 lb/hr/ft$^3$ or greater, such as about 14 lb/hr/ft$^3$ or greater.

In at least one embodiment, little or no alumoxane is used in the process to produce the polymers. Preferably, alumoxane is present at zero mol %. Alternatively, the alumoxane is present at a molar ratio of aluminum to transition metal of a catalyst compound of less than about 500:1, such as less than about 300:1, such as less than about 100:1, such as less than about 1:1.

In a preferred embodiment, little or no scavenger is used in the process to produce the heterogeneous polyethylene granules. Scavenger (such as tri alkyl aluminum) can be present at zero mol %. Alternatively, the scavenger is present at a molar ratio of scavenger metal to transition metal of the catalyst of less than about 100:1, such as less than about 50:1, such as less than about 15:1, such as less than about 10:1.

Polymerization of ethylene monomers and comonomers are performed in a single reaction zone under substantially homogeneous conditions. That is, the ratio of comonomer to ethylene and all other conditions is maintained at substantially the same values throughout the polymerization reaction. As used herein relative to reactor conditions, substantially the homogeneous conditions refers to each of the conditions being maintained at a specific value±10%. For example, if the comonomer to ethylene mole ratio in the reactor is set to 0.022, then there can be deviation during the polymerization process of 0.020-0.024.

In at least one embodiment, the polymerization: 1) is conducted at temperatures of 0 to 300° C. (preferably 25 to 150° C., preferably 40 to 120° C., preferably 65 to 95° C.); 2) is conducted at a pressure of atmospheric pressure to 10 MPa (preferably 0.35 to 10 MPa, preferably from 0.45 to 6 MPa, preferably from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic or alicyclic hydrocarbons, such as cyclohexane, cycloheptane, methylcyclohexane, methylcycloheptane, or mixtures thereof; preferably where aromatics are present in the solvent at less than 1 wt %, preferably less than 0.5 wt %, preferably at 0 wt % based upon the weight of the solvents); 4) wherein the catalyst system used in the polymerization comprises less than 30 wt % aluminum, preferably less than 20 wt % aluminum. Alternatively, the alumoxane is present at a molar ratio of aluminum to transition metal of a catalyst compound of less than 500:1, preferably less than 300:1, preferably less than 100:1; 5) the polymerization preferably occurs in one reaction zone; 6) the productivity of the catalyst compound is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr); 7) optionally, scavengers (such as trialkyl aluminum compounds) are absent (e.g., present at zero mol %). Alternatively, the scavenger is present at a molar ratio of scavenger metal to transition metal of less than 100:1, preferably less than 50:1, preferably less than 15:1, preferably less than 10:1; and 8) optionally, hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In a preferred embodiment, the catalyst system used in the polymerization comprises no more than one catalyst compound. In a preferred embodiment, the polymerization occurs in one reaction zone.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Chain transfer agents may be alkylalumoxanes, a compound represented by the formula $AlR_3$, $ZnR_2$ (where each R is, independently, a $C_1$-$C_8$ aliphatic radical, preferably methyl, ethyl, propyl, butyl, penyl, hexyl, heptyl, octyl or an isomer thereof) or a combination thereof, such as diethyl zinc, methylalumoxane, trimethylaluminum, triisobutylaluminum, trioctylaluminum, or a combination thereof.

Blends

In at least one embodiment, the polymer (such as polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidene fluoride, polyethylene glycols, and/or polyisobutylene. In at least one embodiment, the polymer (such as polyethylene or polypropylene) is present in the above blends, at from about 10 to about 99 wt %, based upon the weight of total polymers in the blend, such as from about 20 to about 95 wt %, such as from about 30 to about 90 wt %, such as from about 40 to about 90 wt %, such as from about 50 to about 90 wt %, such as from about 60 to about 90 wt %, such as from about 70 to about 90 wt %.

Blends of the present disclosure may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

Blends of the present disclosure may be formed using conventional equipment and methods, such as by dry blending the individual components, such as polymers, and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm uder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives can include, for example: fillers; antioxidants (e.g., hindered phenolics such as IRGANOX™ 1010 or IRGANOX™ 1076, available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; mixtures thereof, and the like.

Films

Any of the foregoing polymers, such as the foregoing polyethylenes or blends thereof, may be used in a variety of end-use applications. Such applications include, for example, mono- or multi-layer blown, extruded, and/or shrink films. These films may be formed by any suitable extrusion or coextrusion techniques, such as a blown bubble film processing technique, where the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble process and may occur before or after the individual layers are brought together. For example, a polyethylene layer can be extrusion coated or laminated onto an oriented polypropylene layer or the polyethylene and polypropylene can be coextruded together into a film then oriented.

Likewise, oriented polypropylene could be laminated to oriented polyethylene or oriented polyethylene could be coated onto polypropylene then optionally the combination could be oriented even further. Typically, the films are oriented in the Machine Direction (MD) at a ratio of up to 15, preferably between 5 and 7, and in the Transverse Direction (TD) at a ratio of up to 15, preferably 7 to 9. However, in another embodiment, the film is oriented to the same extent in both the MD and TD directions.

The films may vary in thickness depending on the intended application; however, films of a thickness from 1 μm to 50 μm may be suitable. Films intended for packaging are usually from 10 μm to 50 μm thick. The thickness of the sealing layer is typically 0.2 μm to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

EXAMPLE EMBODIMENTS

Example 1

A method comprising: contacting first olefin monomers and second olefin monomers with a catalyst system in a single reaction zone to produce heterogeneous polyethylene granules; wherein the catalyst system comprises a product of a combination comprising: one or more catalysts having a Group 3 through Group 12 metal atom or lanthanide metal atom; at least one activator; and one or more support material compositions; and wherein the heterogeneous polyethylene granules comprise: a first portion comprising a first polyethylene comprising the first olefin monomers and the second olefin monomers; a second portion comprising a second polyethylene comprising the first monomers and the second monomers; and wherein the first polyethylene has a higher second monomer weight percent than the second polyethylene.

Example 2

The method of Example 1, wherein the support material comprises particulates having a volume percent of pores with a pore size of from 300 angstroms up to 1500 angstroms is from 10 vol % to 80 vol % (or any range or subrange described herein).

Example 3

The method of any one of the preceding Examples, wherein the volume percent of pores with a pore size of from 300 angstroms up to 1500 angstroms is from 40 vol % to 55 vol %.

Example 4

The method of any one of the preceding Examples, wherein the particulates further have a BET surface area of less than 900 $m^2/g$.

Example 5

The method of any one of the preceding Examples, wherein the particulates further have a BET surface area of 100 $m^2/g$ than 700 $m^2/g$.

Example 6

The method of any one of the preceding Examples, wherein the single reaction zone is in a gas phase reactor, and wherein contacting occurs at a temperature of from 0° C. to 300° C. (or any range or subrange described herein), at a pressure in the range of from 0.35 MPa to 10 MPa (or any range or subrange described herein), and at a time up to 500 minutes.

Example 7

The method of any one of the preceding Examples, wherein the single reaction zone is in a gas phase reactor, and wherein contacting occurs at a temperature of from 25° C. to 100° C. (or any range or subrange described herein), at a pressure in the range of from 0.35 MPa to 10 MPa, and at a time up to 500 minutes (or any range or subrange described herein).

Example 8

The method of any one of the preceding Examples, wherein the single reaction zone is in a gas phase reactor, and wherein contacting occurs at a temperature of from 50° C. to 90° C. (or any range or subrange described herein), at a pressure in the range of from 0.35 MPa to 10 MPa, and at a time up to 500 minutes (or any range or subrange described herein).

Example 9

The method of any one of the preceding Examples, wherein the first polyethylene has a lower density than the second polyethylene.

Example 10

The method of any one of the preceding Examples, wherein the second portion is at a core of the heterogeneous polyethylene granules and the first portion is at a surface of the heterogeneous polyethylene granules.

Example 11

The method of any one of Examples 1-9, wherein the first portion is at a core of the heterogeneous polyethylene granules and the second portion is at a surface of the heterogeneous polyethylene granules.

Example 12

The method of any one of the preceding Examples, wherein the second monomer weight percent for the first polyethylene is about 11% to about 25% (or any subrange described herein) and the second monomer weight percent in the second polyethylene is about 2% to about 8% (or any range or subrange described herein).

Example 13

The method of any one of the preceding Examples, wherein difference between the second monomer weight percent for the first polyethylene and the second monomer weight percent in the second polyethylene is about 5% to about 25% (or any range or subrange described herein).

Example 14

The method of any one of the preceding Examples, wherein a volume-weighted comonomer content histogram has a variance of 2 wt $\%^2$ or greater (or any range or subrange described herein).

Example 15

The method of any one of the preceding Examples, wherein a comonomer content line profile has a peak comonomer content minus a minimum comonomer content of 8 wt % to 25 wt % (or any range or subrange described herein).

Example 16

The method of any one of the preceding Examples, wherein the first olefin monomer and the second olefin monomer are different and selected from the group consisting of ethylene, propylene, butene, pentene, hexene, heptene, octene, nonene, decene, undecene, dodecene, or mixtures thereof.

Example 17

The method of any one of the preceding Examples, wherein the first olefin monomer is ethylene and the second olefin monomer is hexene.

Example 18

The method of any one of the preceding Examples, wherein the particulates have a particle size distribution D50 of 36 microns or greater (or any range or subrange described herein).

Example 19

The method of any one of the preceding Examples, wherein a mean sphericity of the particulates is at least 0.970 (or any range or subrange described herein).

Example 20

The method of any one of the preceding Examples, wherein the particulates comprise $Al_2O_3$, $ZrO_2$, $SiO_2$, $SiO_2/Al_2O_3$, $SiO_2/TiO_2$, silica clay, silicon oxide/clay, or mixtures thereof.

Example 21

The method of any one of the preceding Examples, wherein the particulates comprise $SiO_2$.

Example 22

The method of any one of the preceding Examples, wherein the one or more catalysts is at least one metallocene catalyst.

Example 23

The method of any one of the preceding Examples, wherein the at least one activator is methylalumoxane and is present at a molar ratio of aluminum to catalyst metal of 200:1 or less (or any range or subrange described herein).

Example 24

The method of any one of the preceding Examples, wherein the one or more support material composition is $SiO_2$ and the catalyst system has an uncrushed (Al/Si)/crushed (Al/Si) value of from 0.6 to 10 as determined by X-ray Photoelectron Spectroscopy (or any range or subrange described herein).

Example 25

The method of any one of the preceding Examples, wherein the catalyst system comprises the production of the combination of a first catalyst and a second catalyst each having a different chemical structure, the second catalyst having a Group 3 through Group 12 metal atom or lanthanide metal atom.

Example 26

The heterogeneous polyethylene granules produced according to any one of the preceding Examples.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Test Methods. Dynamic Image Analysis. Particle size (PS) or diameter of support material composition and polymer granules, and distributions thereof, are determined by dynamic image analysis using a CAMSIZER™ P4 (range of 30 µm to 30 mm) available from Retsch Technology GmbH, Haan, Germany, or a CAMSIZER™ XT with a wet module (range of 0.4 to 2000 µm) available from Retsch Technology GmbH, Haan, Germany. Average PS refers to the distribution of particle volume with respect to particle size. Unless otherwise indicated expressly or by context, "particle" refers to the overall particle body or assembly such as an aggregate, agglomerate, or encapsulated agglomerate, rather than subunits or parts of the body, such as the primary particles in agglomerates or the elementary particles in an aggregate.

Gel Permeation Chromatography. The distribution and the moments of molecular weight (Mw, Mn, Mw/Mn, etc.), the comonomer content ($C_2$, $C_3$, $C_6$, etc.) and the long chain branching (g') are determined by using a high temperature gel permeation chromatography (Polymer Char GPC-IR) equipped with a multiple-channel band-filter based Infrared detector IR5, an 18-angle light scattering detector and a viscometer. Three Agilent PLgel 10 µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 µm Teflon filter and degassed with an online degasser before entering the GPC instrument. The nominal flow rate is 1.0 mL/min and the nominal injection volume is 200 μL. The whole system including transfer lines, columns, detectors are contained in an oven maintained at 145° C. A given amount of polymer sample is weighed and sealed in a standard vial with 80 μL flow marker (heptane) added to it. After loading the vial in the autosampler, polymer is automatically dissolved in the instrument with 8 mL added TCB solvent. The polymer is dissolved at 160° C. with continuous shaking for about 1 hour for most PE samples or 2 hours for PP samples. The TCB densities used in concentration calculation are 1.463 g/ml at about 23° C. and 1.284 g/ml at 145° C. The sample solution concentration is from 0.2 to 2.0 mg/ml, with lower concentrations being used for higher molecular weight samples.

The concentration (c), at each point in the chromatogram is calculated from the baseline-subtracted IR5 broadband signal intensity (I), using the following equation: c=βI, where β is the mass constant determined with PE or PP standards. The mass recovery is calculated from the ratio of the integrated area of the concentration chromatography over elution volume and the injection mass, which is equal to the pre-determined concentration multiplied by injection loop volume.

The conventional molecular weight (IR MW) is determined by combining universal calibration relationship with the column calibration which is performed with a series of monodispersed polystyrene (PS) standards ranging from 700 to 10M. The MW at each elution volume is calculated with following equation:

$$\log M = \frac{\log(K_{PS}/K)}{a+1} + \frac{a_{PS}+1}{a+1}\log M_{PS},$$

where the variables with subscript "PS" stands for polystyrene while those without a subscript are for the test samples.

In this method, $a_{PS}$=0.67 and $K_{PS}$=0.000175 while a and K are calculated from a series of empirical formula established in ExxonMobil and published in literature (T. Sun, P. Brant, R. R. Chance, and W. W. Graessley, Macromolecules, Volume 34, Number 19, pp. 6812-6820, (2001)). Specifically, a/K=0.695/0.000579 for PE and 0.705/0.0002288 for PP.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR such as EMCC commercial grades about LLDPE.

The LS detector is the 18-angle Wyatt Technology High Temperature DAWN HELEOSII. The LS molecular weight (M) at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K \circ c}{\Delta R(\theta)} = \frac{1}{MP(\theta)} + 2A_2 c,$$

where $\Delta R(\theta)$ is the measured excess Rayleigh scattering intensity at scattering angle θ; c is the polymer concentration determined from the IR5 analysis; $A_2$ is the second virial coefficient; P(θ) is the form factor for a monodisperse random coil; and $K_o$ is the optical constant for the system:

$$K \circ = \frac{4\pi^2 n^2 (dn/dc)^2}{\lambda^4 N_A},$$

where $N_A$ is Avogadro's number; (dn/dc) is the refractive index increment for the system; n=1.500 for TCB at 145° C.; and λ=665 nm.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity ($\eta_S$) for the solution flowing through the viscometer is calculated from their outputs. The intrinsic viscosity ([η]) at each point in the chromatogram is calculated from the following equation:

$$[\eta] = \eta_S/C,$$

where c is concentration and was determined from the IR5 broadband channel output.

The viscosity MW at each point is calculated from the below equation:

$$M = K_{PS} M^{a_{PS}+1}/[\eta],$$

Example 1

MAOs were prepared with several silica supports (Table 1) under the conditions of Table 2. Generally, calcined silica and 20 mL of toluene were combined at room temperature. MAO solution (13 wt % Al, available from Albemarle) was added drop-wisely with a pipette at a stir rate of 400 rpm. The addition took 10 minutes and some bubble formation was observed. The solution was stirred for another 10 minutes at room temperature. The container holding the mixture was then placed in a sand bath and heated to 100° C. for 120 min. The slurry was allowed to cool, and then filtered through a 60 mL plastic frit and rinsed first with toluene (2×25 mL) and then with pentane (3×25 mL). The final collected solid was transferred into a 250 mL round bottom flask and dried under vacuum for 3 hours.

TABLE 1

Silica support materials

| Silica | BET Surface Area (m²/g) | BJH Pore Volume (cm³/g) | Calculated Pore Diameter (nm) | Mean Particle Size (μm) |
|---|---|---|---|---|
| D948* | 266 | 1.69 | 29.6 | 58 |
| DM-L-403 | 322 | 2.24 | 27.8 | 42 |
| DM-M-302 | 580 | 1.84 | 12.7 | 35 |

*available from Grace & Co.

TABLE 2

MAO production conditions

| Silica | Calcination Temp (° C.) | Prep Temp (° C.) | MAO loading (mmol/g silica) | Heat Time (hr) | MAO uptake (mmol/g silica) |
|---|---|---|---|---|---|
| D948 | 600 | 100 | 7.5 | 2 | 6.3 |
| DM-L-403 | 600 | 100 | 10 | 2 | 8.2 |
| DM-M-302 | 600 | 100 | 10 | 2 | 7.6 |

The MAOs were then used as a support for a bis(1-butyl, 3-methylcyclopentadienyl) zirconium dichloride) catalyst. Generally, in a 20 ml glass vial 0.5 grams of MAO and 1.5 grams of toluene were combined. A stock solution of the catalyst in toluene was added drop-wisely via a pipette. The sealed vial was then placed on a vortexer and vortexed the mixture at room temperature for 60 min. The slurry was allowed to settle and the supernatant was removed with a pipette. The residue was dried under vacuum at 45° C. for 45 min and then at room temperature of a total drying time 2 hr). For each supported catalyst, the catalyst loading is about 39 μmol Zr/g supported catalyst.

Polyethylene was synthesized using the three supported catalysts, ethylene monomer, and 1-hexene comonomer in a 2 L salt-bed batch reactor. The three polymerization runs were carried out (Table 3) at the same temperature, pressure, and compositional control condition (the gas phase $C_6/C_2$ mol ratio and the $H_2/C_2$ mol ratio were maintained substantially consistent throughout the polymerization run).

TABLE 3

Polymerization conditions

| Silica support | Catalyst loading (umol Zr/g silica) | $C_6/C_2$ mol ratio | $H_2/C_2$ mol ratio (mol/ppm) | Temperature (° C.) | Productivity (g/g) |
|---|---|---|---|---|---|
| D948 | 39 | 0.022 | 2.5 | 85 | 4398 |
| DM-L-403 | 39 | 0.022 | 2.5 | 85 | 4364 |
| DM-M-302 | 39 | 0.022 | 2.5 | 85 | 4392 |

Figure 3:
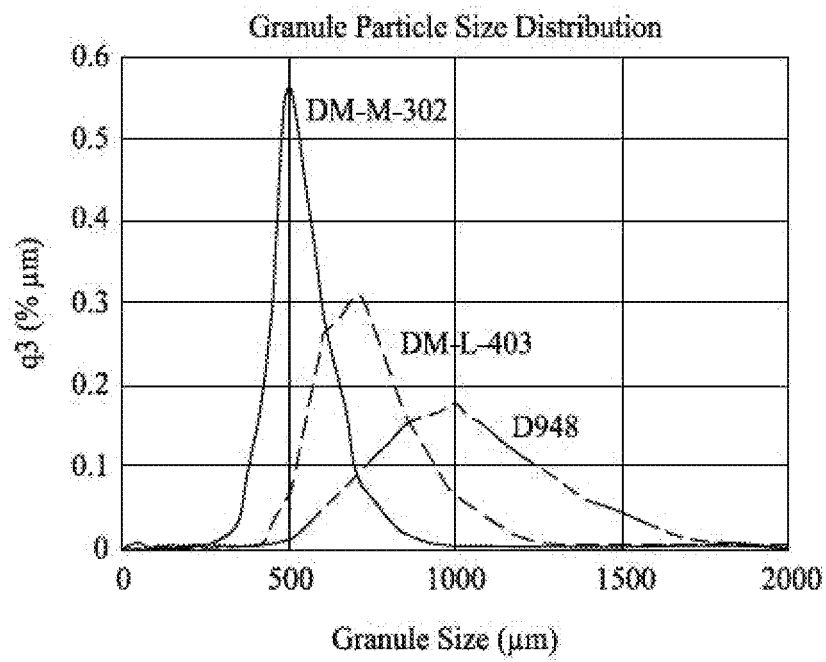
FIG. 3 is a granule particle size distribution plot for as-produced polyethylene granules.
Figure 4A:
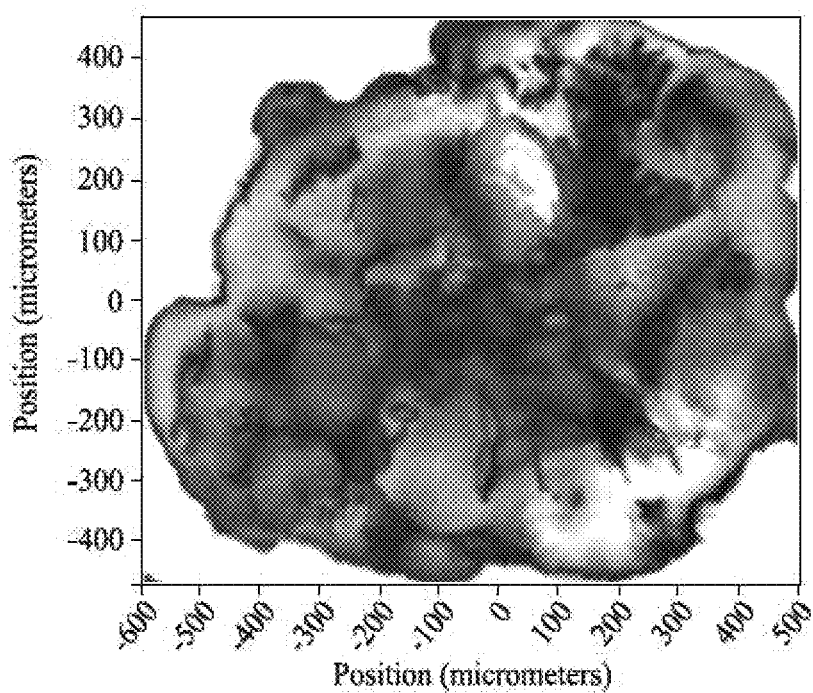
FIGS. 4A-4F are the stereomicroscopic images (FIGS. 4A and 4D), the comonomer content maps (FIGS. 4B and 4E), and the volume-weighted comonomer content histograms (FIGS. 4C and 4F) for two D948 silica supported catalyst produced polyethylene granules.
Figure 4B:
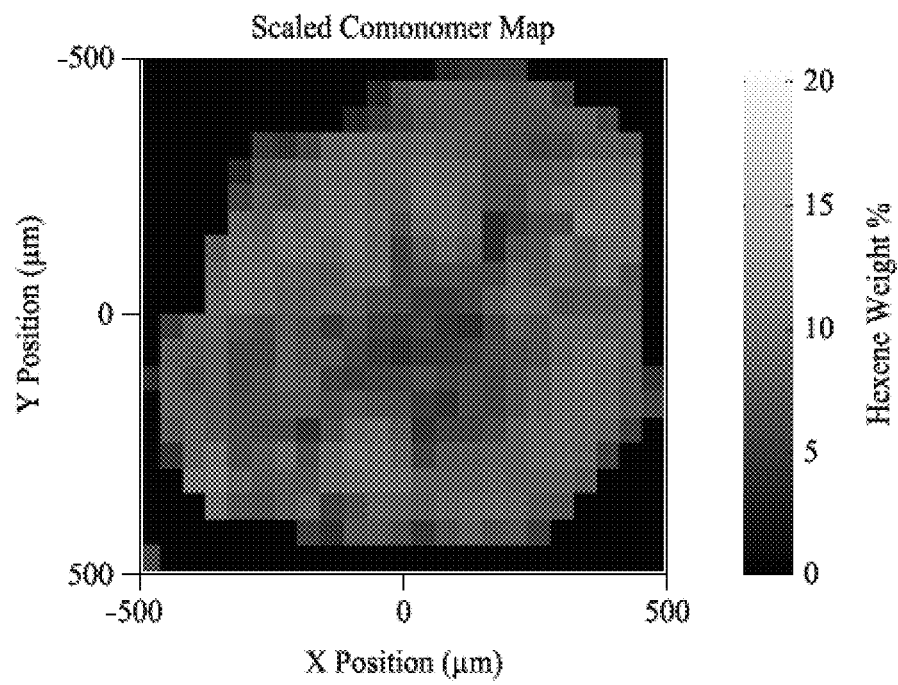
Figure 4C:
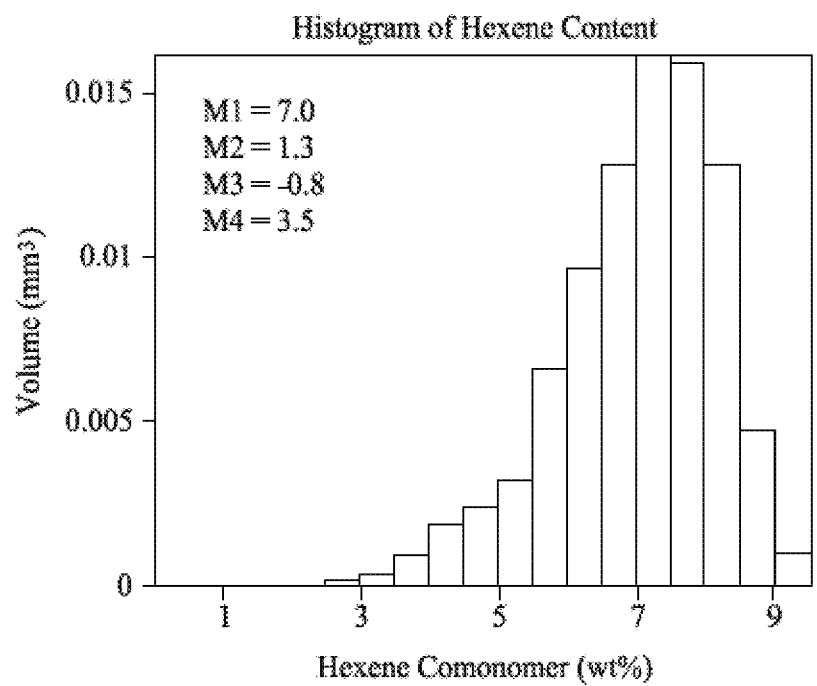
Figure 4D:
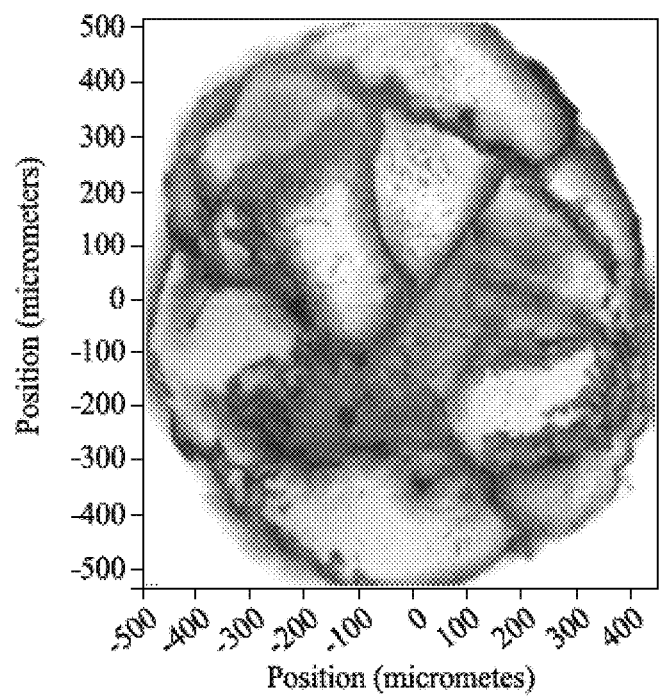
Figure 4E:
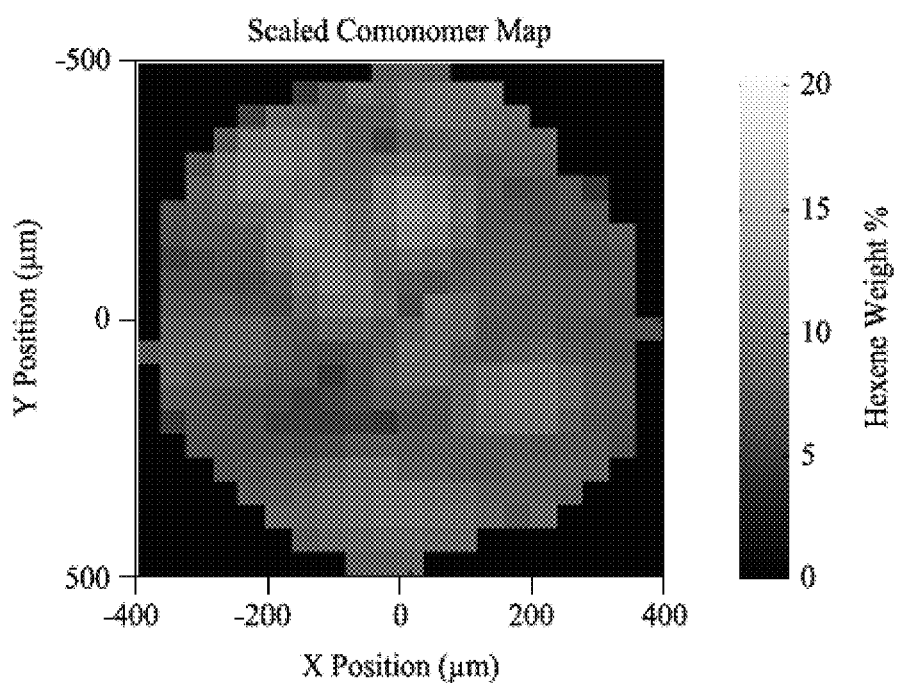
Figure 4F:
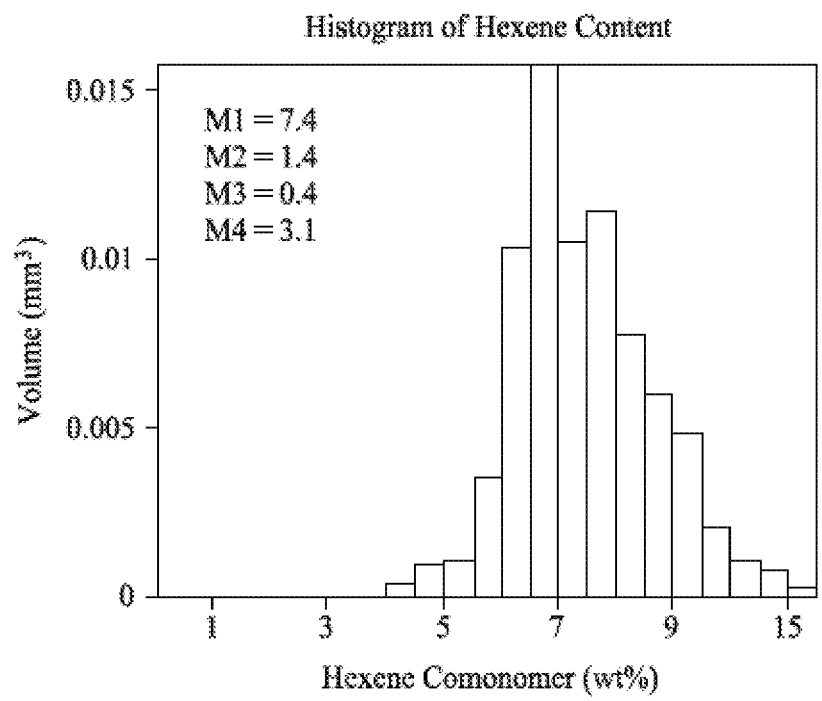
Figure 5A:
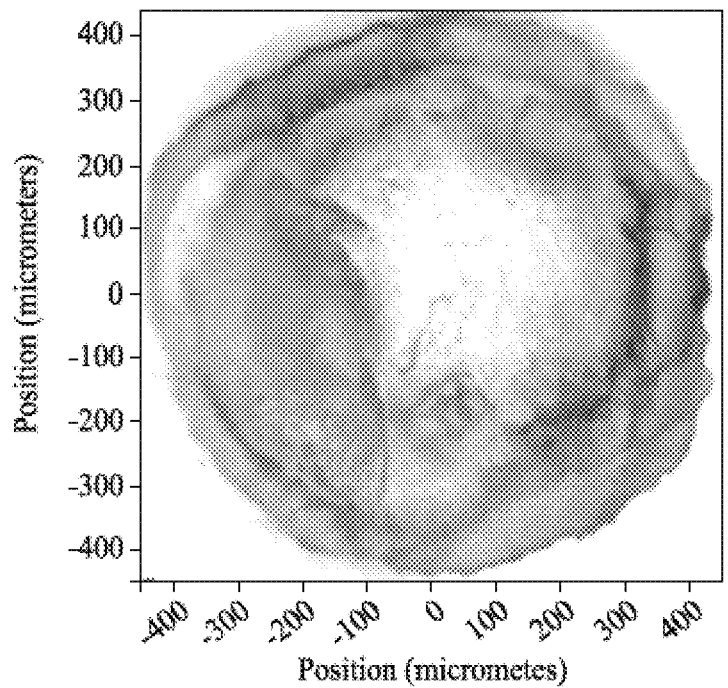
FIGS. 5A-5F are the stereomicroscopic images (FIGS. 5A and 5D), the comonomer content maps (FIGS. 5B and 5E), and the volume-weighted comonomer content histograms (FIGS. 5C and 5F) for two DM-L-403 silica supported catalyst produced polyethylene granules.
Figure 5B:
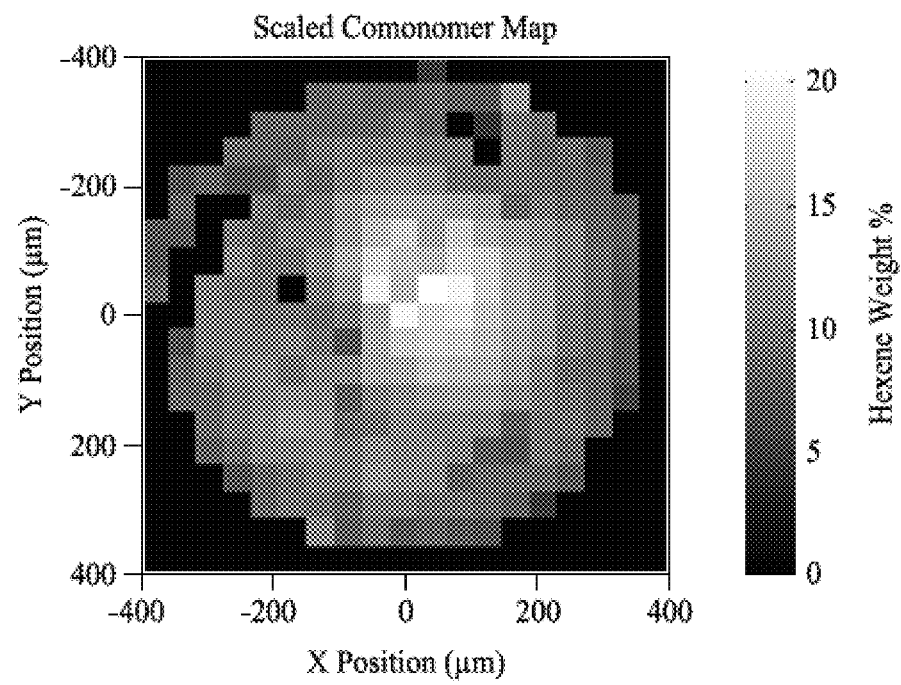
Figure 5C:
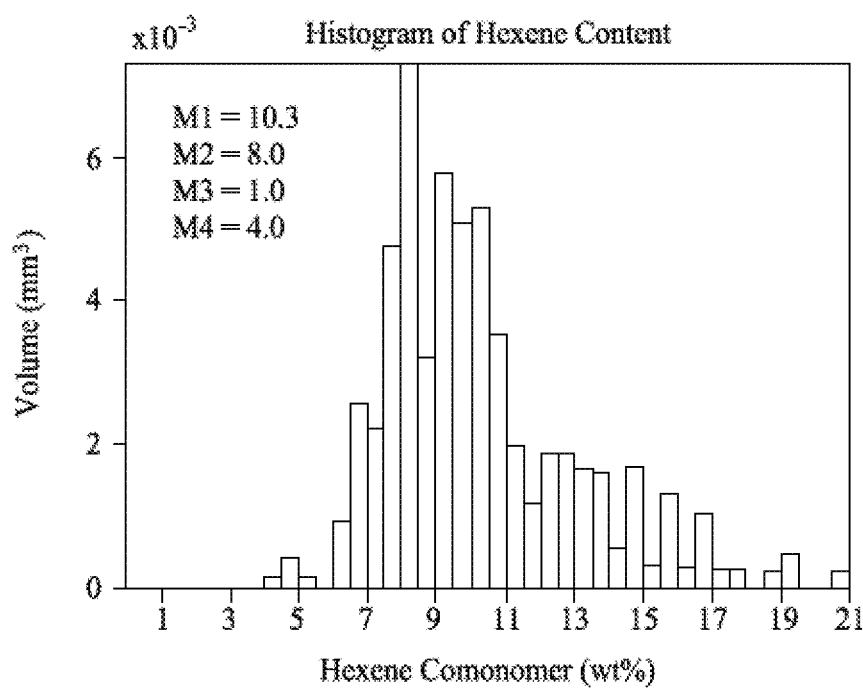
Figure 5D:
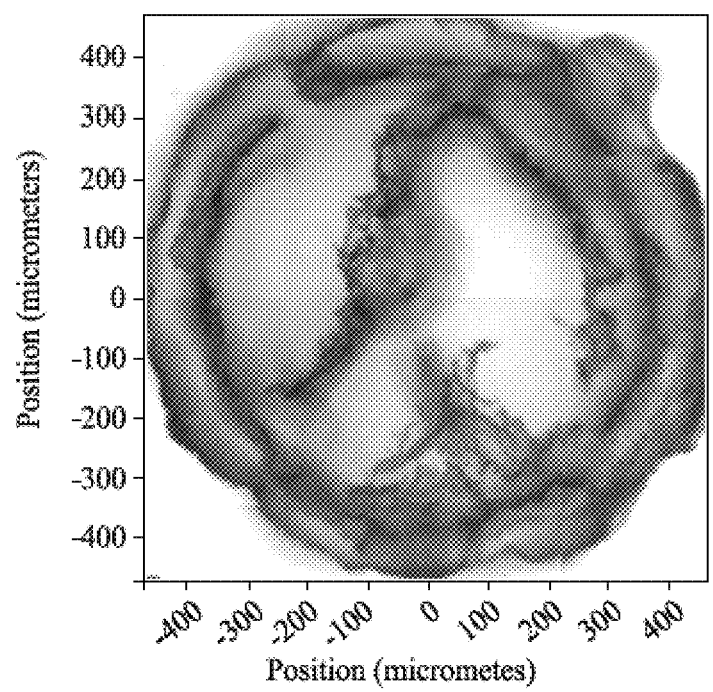
Figure 5E:
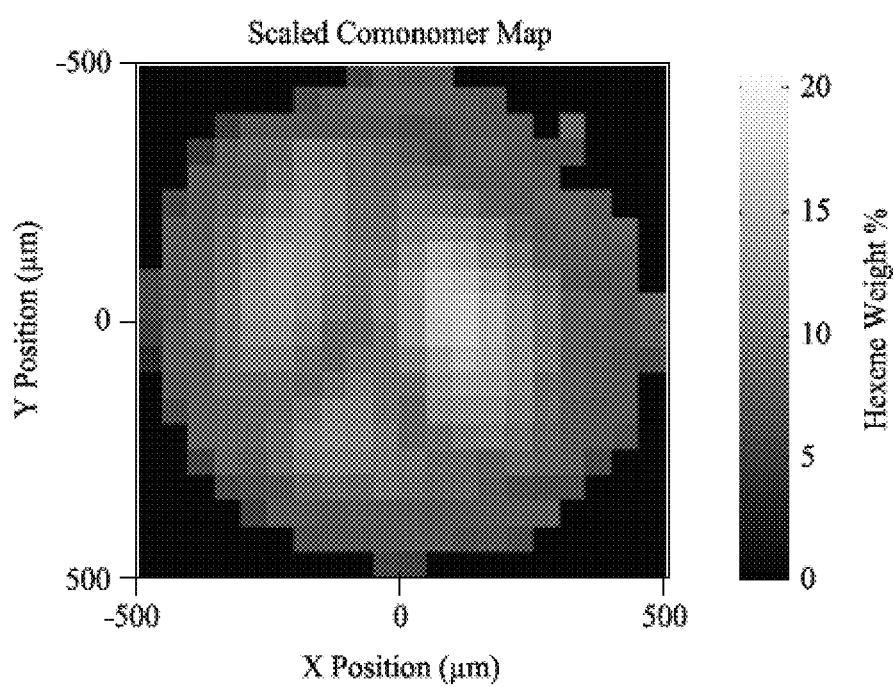
Figure 5F:
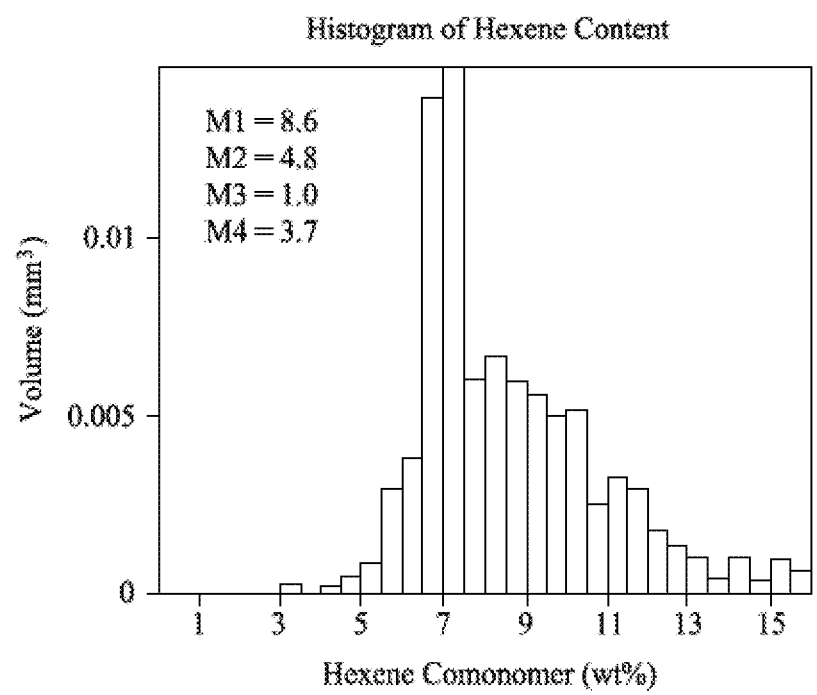
Figure 6A:
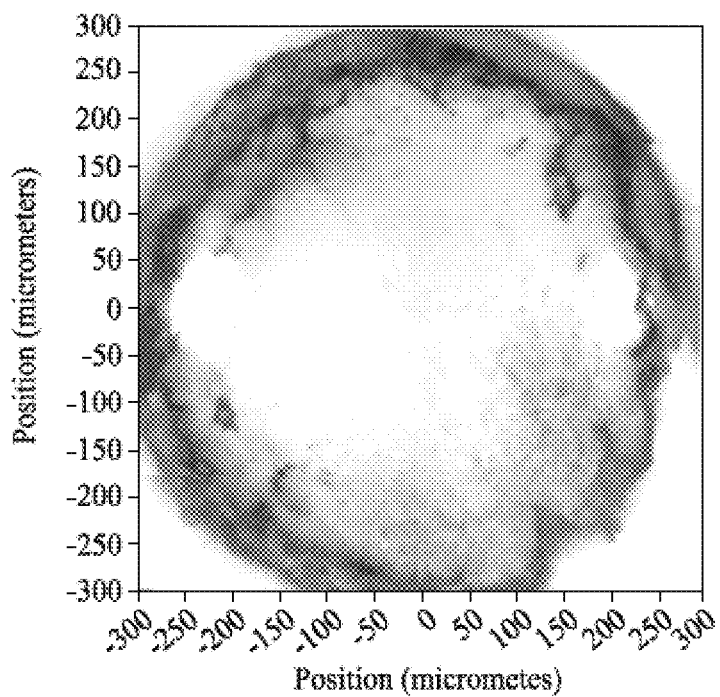
FIGS. 6A-6F are the stereomicroscopic images (FIGS. 6A and 6D), the comonomer content maps (FIGS. 6B and 6E), and the volume-weighted comonomer content histograms (FIGS. 6C and 6F) for two DM-M-302 silica supported catalyst produced polyethylene granules.
Figure 6B:
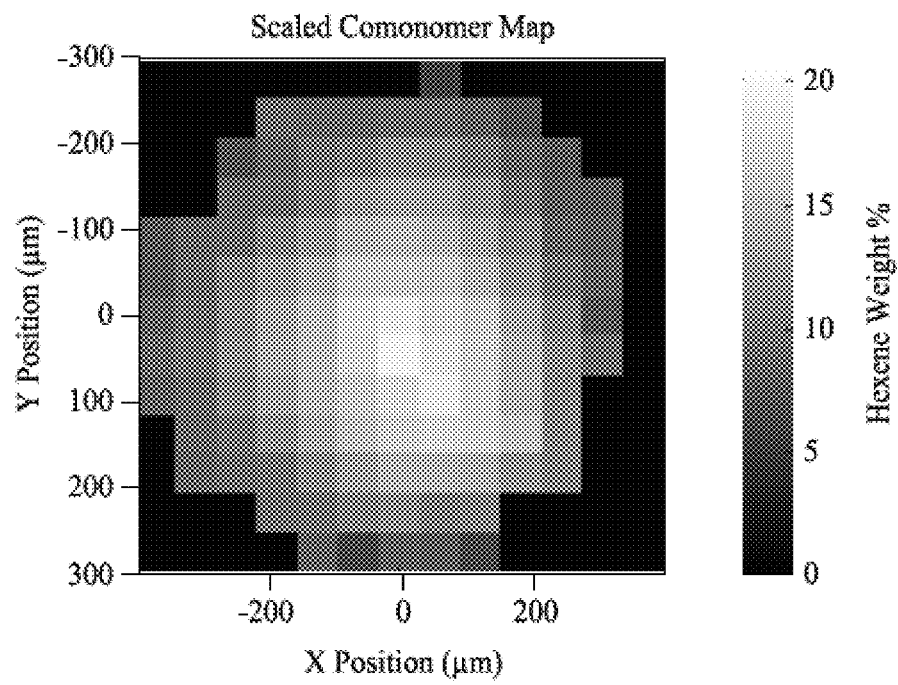
Figure 6C:
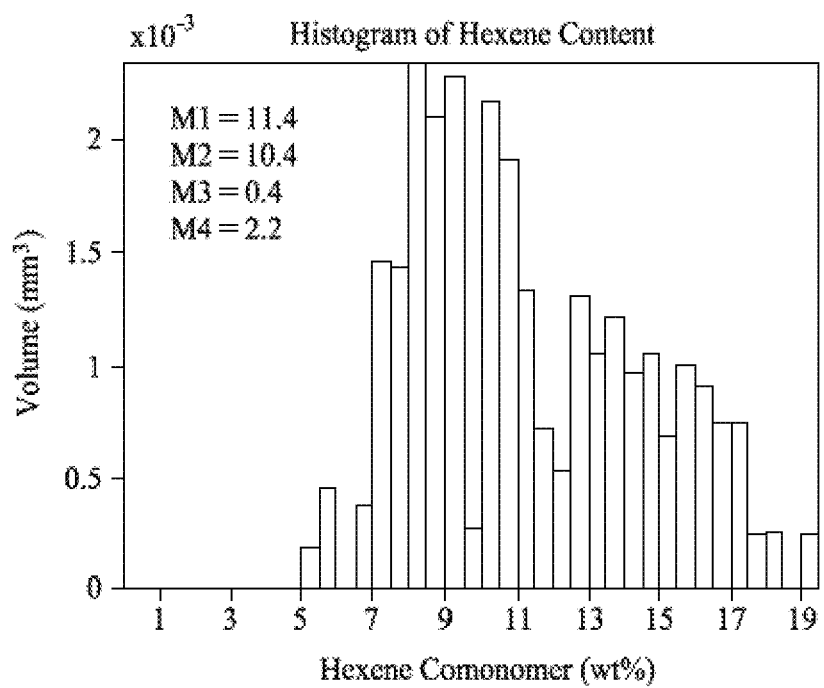
Figure 6D:
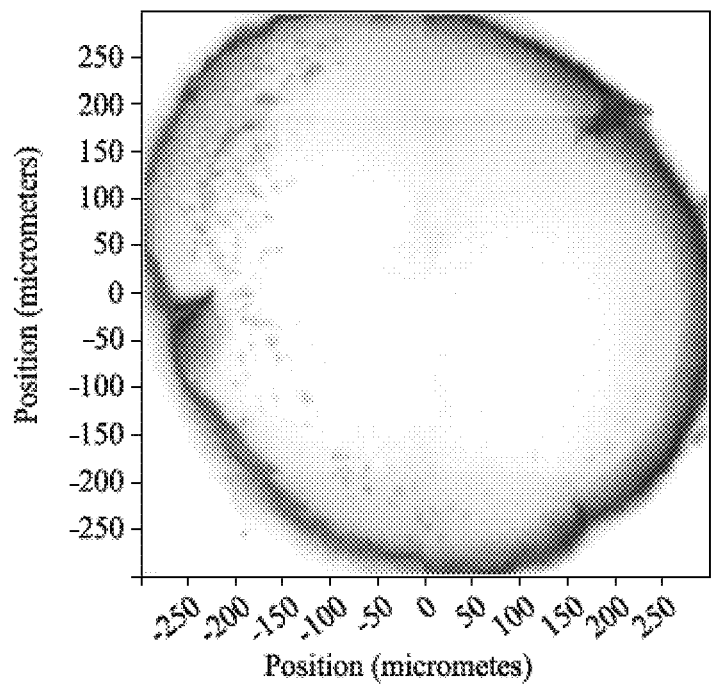
Figure 6E:
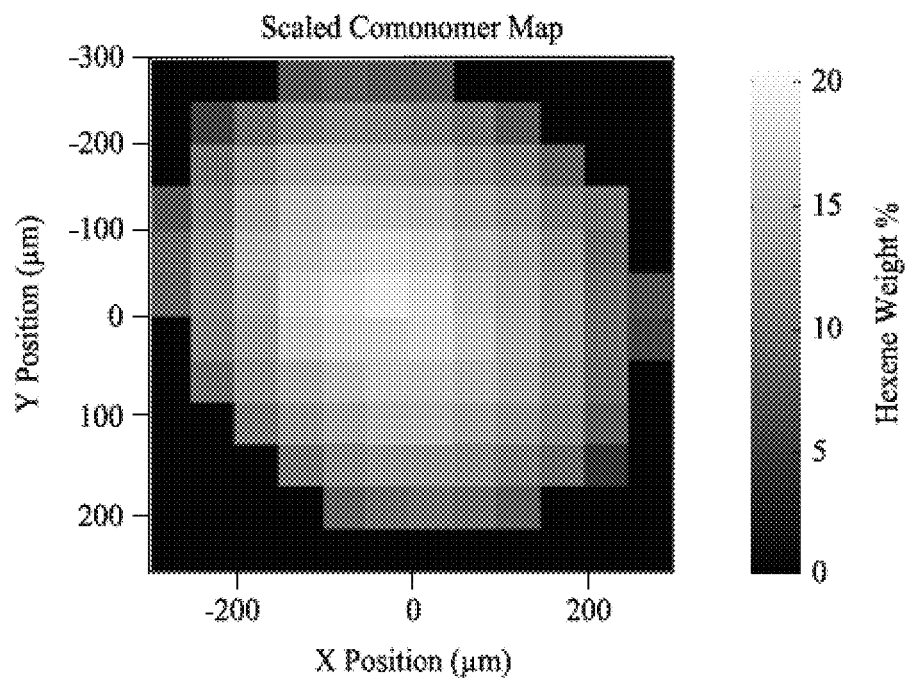
Figure 6F:
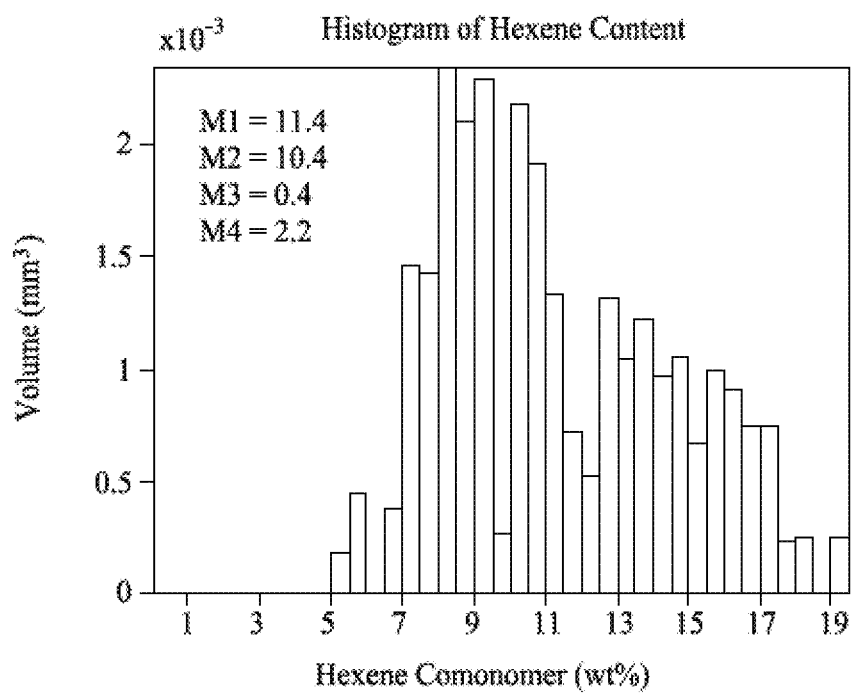
Figure 7A:
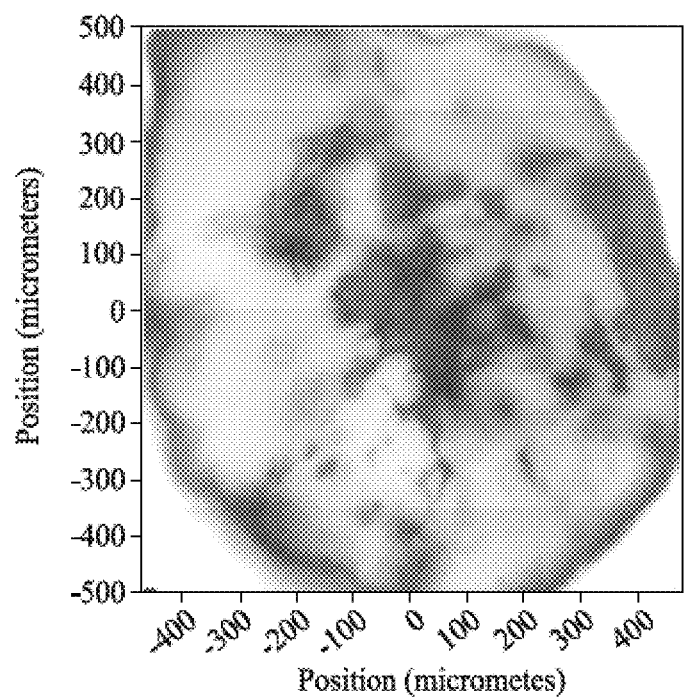
FIGS. 7A-7F are the stereomicroscopic images (FIGS. 7A and 7D), the comonomer content maps (FIGS. 7B and 7E), and the volume-weighted comonomer content histograms (FIGS. 7C and 7F) for two commercially produced polyethylene granules with D948 silica supported catalyst.
Figure 7B:
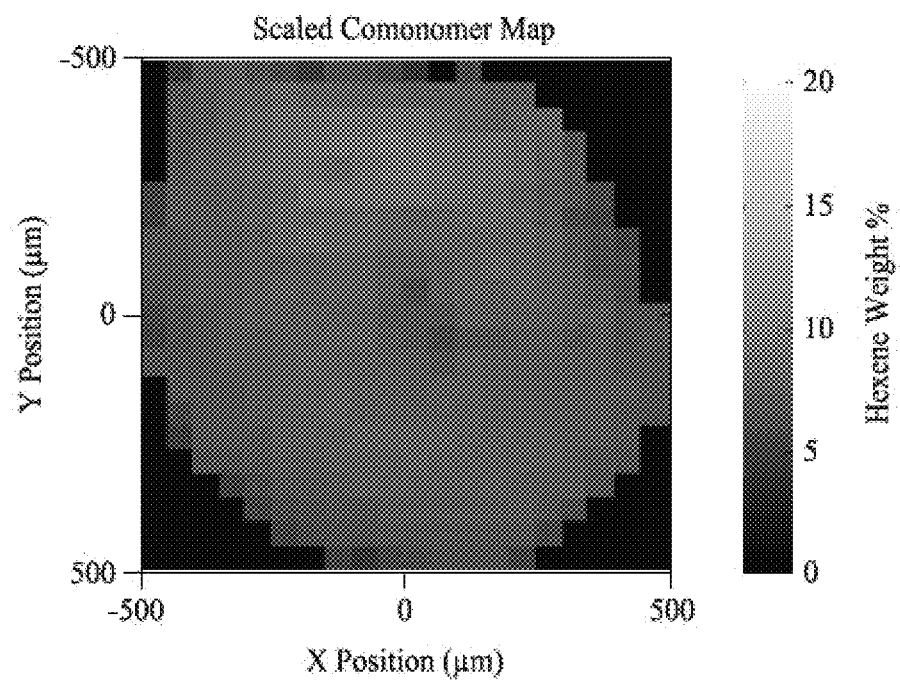
Figure 7C:
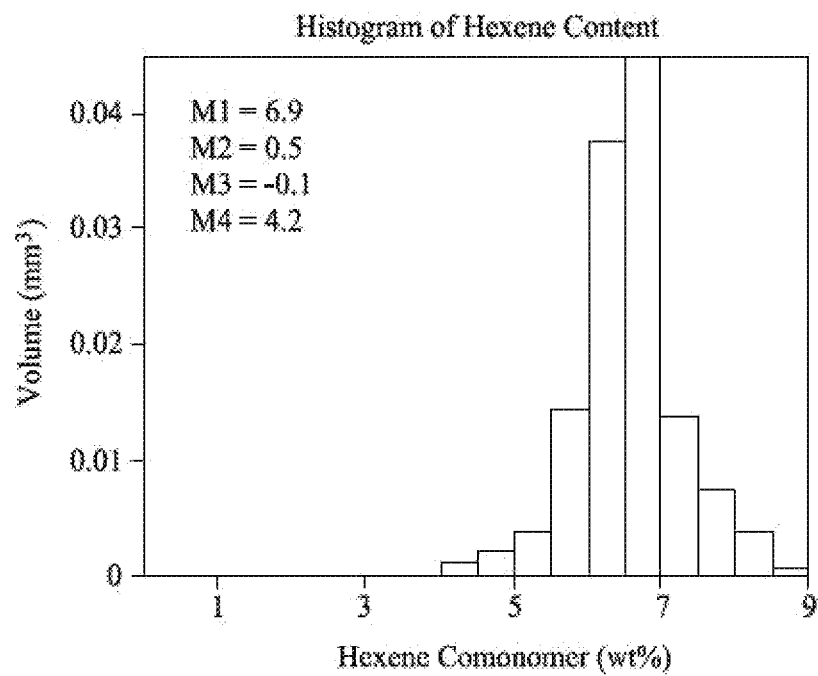
Figure 7D:
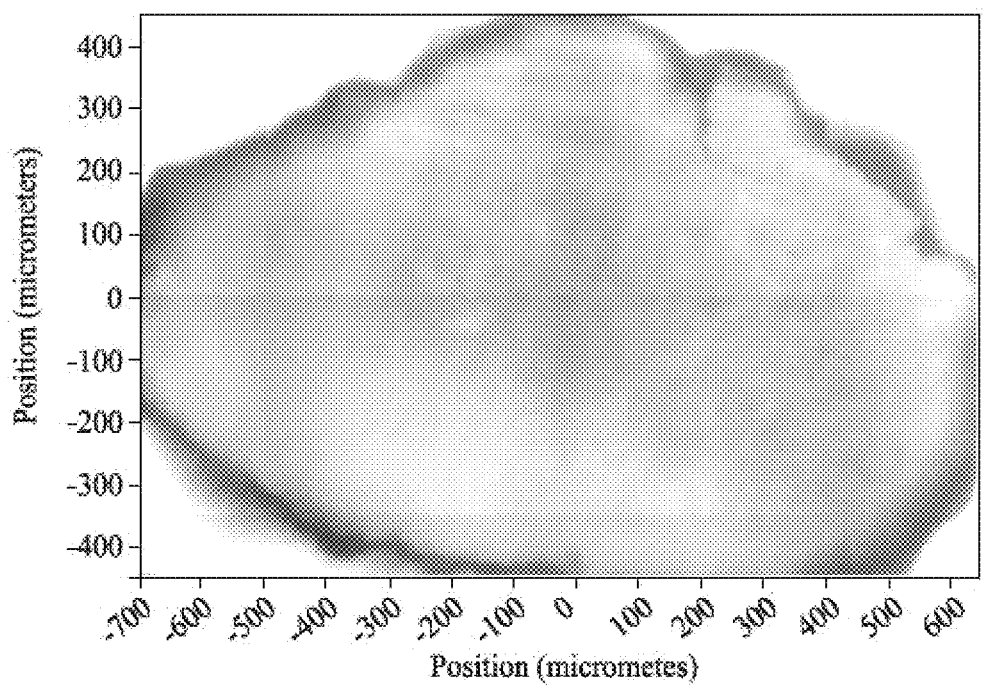
Figure 7E:
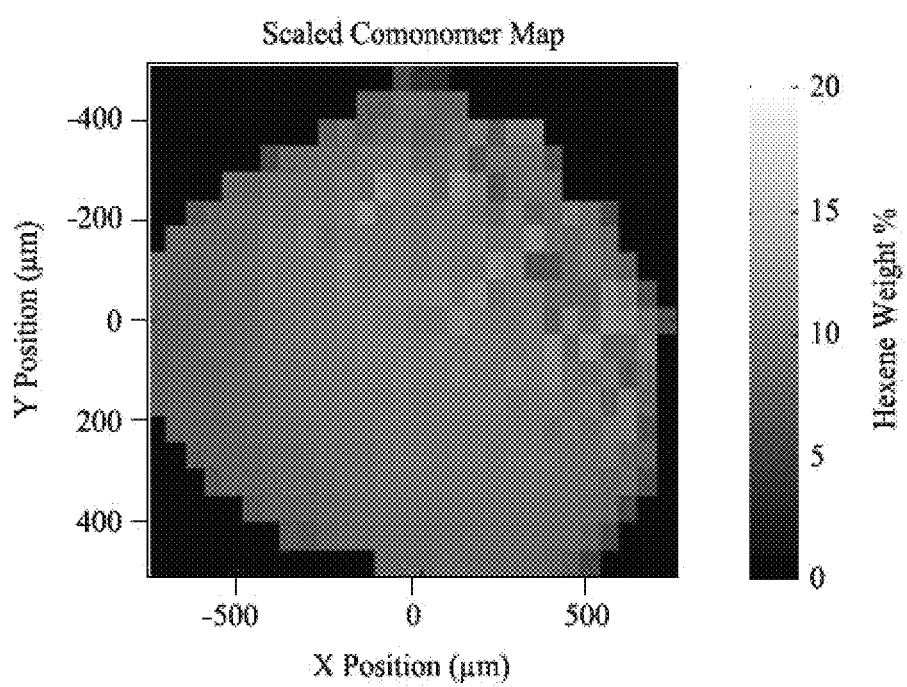
Figure 7F:
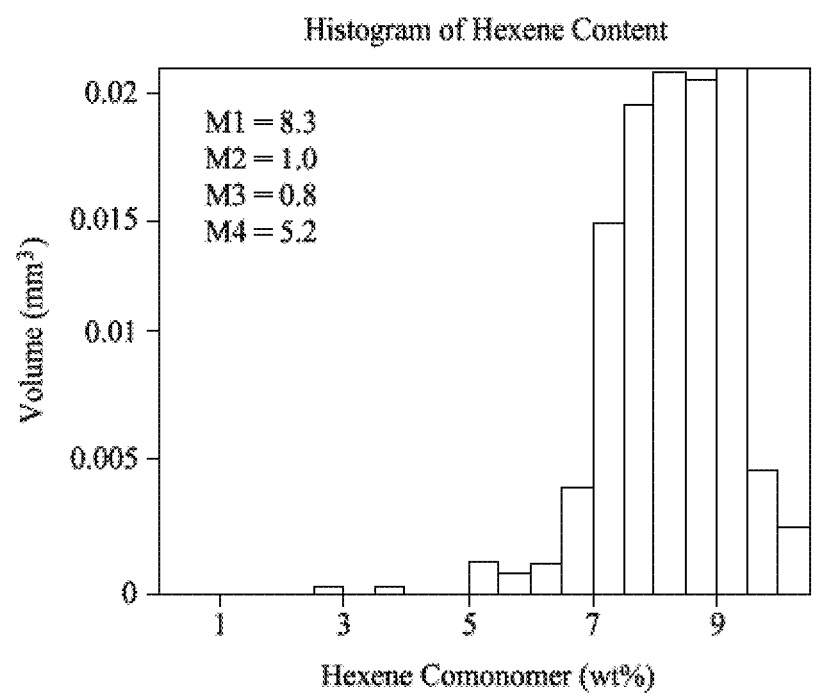
Figure 8A:
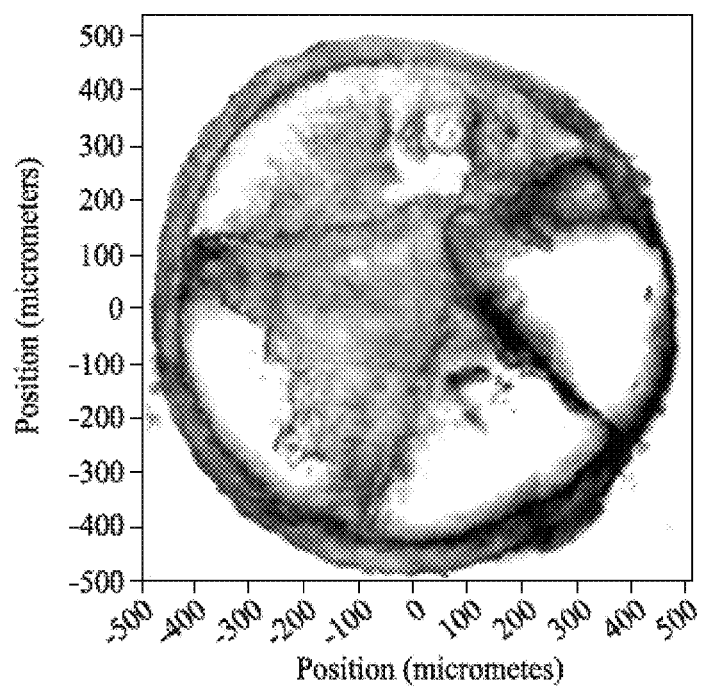
FIGS. 8A-8F are the stereomicroscopic images (FIGS. 8A and 8D), the comonomer content maps (FIGS. 8B and 8E), and the volume-weighted comonomer content histograms (FIGS. 8C and 8F) for another two DM-L-403 silica supported catalyst produced polyethylene granules.
Figure 8B:
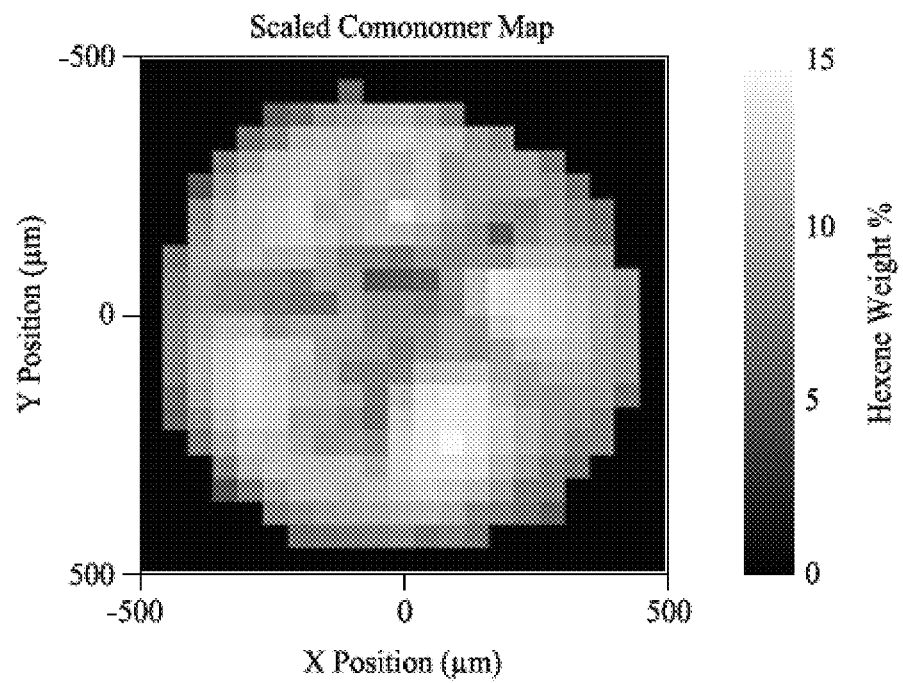
Figure 8C:
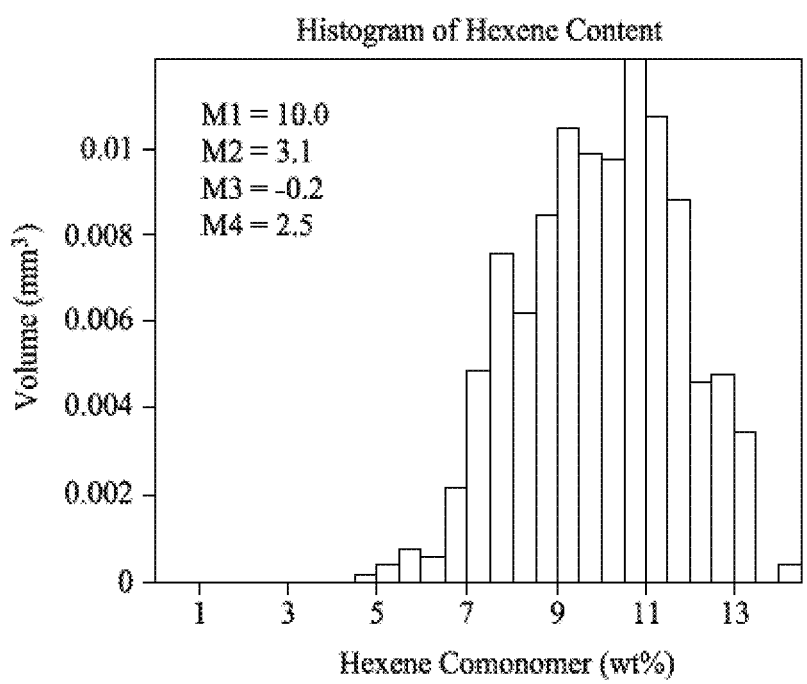
Figure 8D:
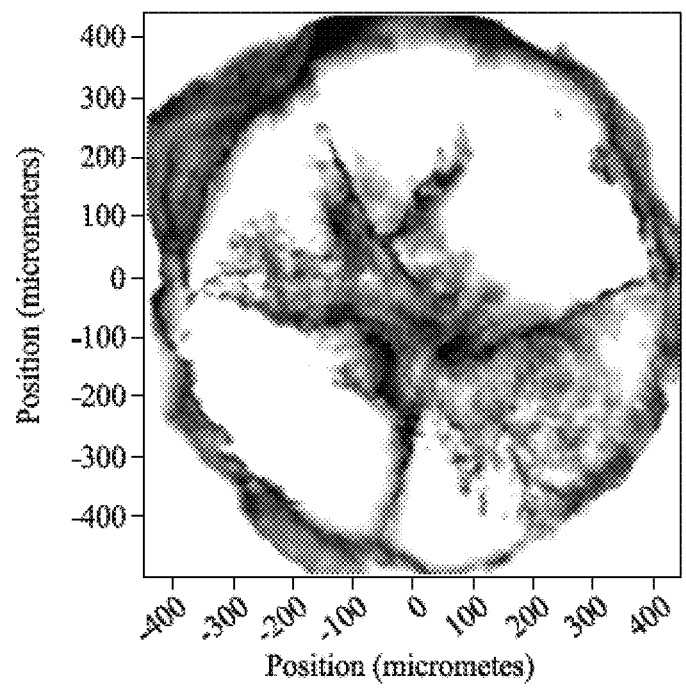
Figure 8E:
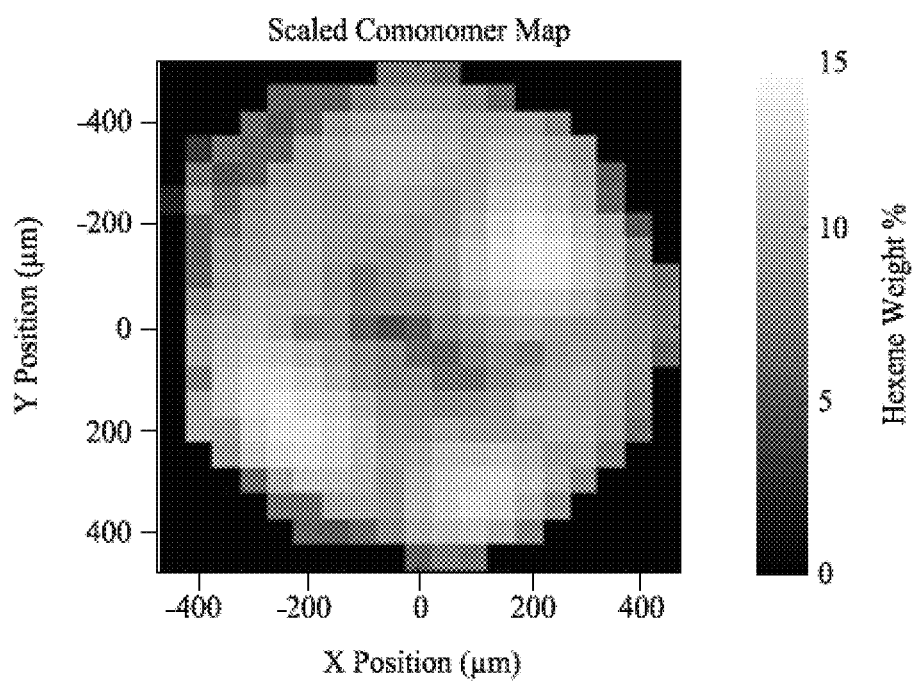
Figure 8F:
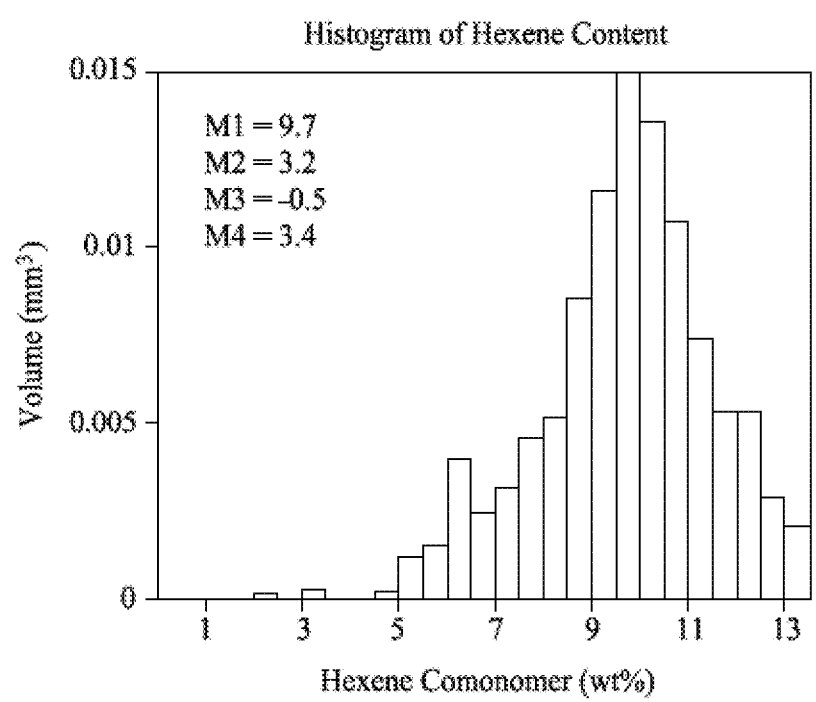

The particle size distribution of granule batches from the Table 3 runs were measured with dynamic image analysis. The results are shown in FIG. 3 where the D948 supported catalyst produced a much broader distribution of granule sizes than the DM-L-403 and DM-M-302 supported catalyst.

The produced polyethylene granules from each Table 3 run were sieved into multiple size groups. Each size group was analyzed via high temperature gel permeation chromatography to determine the molecular weight distribution/characteristics and hexene content (wt % $C_6$) of each size group. The results are shown in Table 4.

TABLE 4

Molecular weight distribution/characteristics

| Silica support | Sieved Size Range (mm) | Mw (k) | PDI | Wt % $C_6$ |
|---|---|---|---|---|
| D948 | 0.355-0.50 | 94 | 2.75 | 7.44 |
| | 0.50-0.71 | 93 | 2.75 | 7.07 |
| | 0.71-1.00 | 93 | 2.67 | 7.51 |
| | 1.00-1.40 | 93 | 2.8 | 7.47 |
| DM-L-403 | 0.125-0.355 | 101 | 2.72 | 8.52 |
| | 0.355-0.50 | 95 | 2.75 | 10.64 |
| | 0.50-0.71 | 94 | 2.85 | 10.35 |
| | 0.71-1.00 | 95 | 2.78 | 9.05 |
| DM-M-302 | 0.125-0.355 | 102 | 2.62 | 9.11 |
| | 0.355-0.50 | 103 | 2.71 | 10.84 |
| | 0.50-0.71 | 103 | 2.75 | 9.99 |
| | 0.71-1.00 | 105 | 2.69 | 8.82 |

This illustrates that for granules of the same size, the molecular weight characteristics are substantially the same, but the comonomer incorporation is different.

High-temperature 13C NMR was carried out to compare the triad distribution pattern among the three granule batches from size group 0.71-1.00 mm. The results from the 13C NMR study are shown below in Table 5. The comparison of the triad sequence distribution show similar pattern among the three polymer samples.

TABLE 5

| Support | D948 | DM-L-403 | DM-M-302 |
|---|---|---|---|
| Mol % Ethylene | 97.44 | 96.74 | 96.14 |
| Mol % Hexene | 2.56 | 3.26 | 3.86 |
| Wt % Ethylene | 92.70 | 90.83 | 89.24 |
| Wt % Hexene | 7.30 | 9.17 | 10.76 |
| B4/1000C* | 12.77 | 16.04 | 18.42 |
| Triad | | Mole Fraction | |
| EEE | 0.9166 | 0.8964 | 0.8818 |
| HEE | 0.0579 | 0.0700 | 0.0777 |
| HEH | 0.0000 | 0.0000 | 0.0008 |
| EHE | 0.0255 | 0.0323 | 0.0375 |
| EHH | 0.0014 | 0.0020 | 0.0023 |
| HHH | 0.0000 | 0.0000 | 0.0000 |

*B4/1000C is butyl branches per 1000 carbons, which is one way of quantifying comonomer incorporation (e.g., for one 1-hexene incorporation would create one butyl branch).

The comonomer content map was measured as described above for two granules of each of the three granule batches.

FIGS. 4A-4F are the stereomicroscopic images (FIGS. 4A and 4D), the comonomer content maps (FIGS. 4B and 4E), and the volume-weighted comonomer content histograms (FIGS. 4C and 4F) for two D948 supported catalyst produced polyethylene granules (Example 1).

FIGS. 5A-5F are the stereomicroscopic images (FIGS. 5A and 5D), the comonomer content maps (FIGS. 5B and 5E), and the volume-weighted comonomer content histograms (FIGS. 5C and 5F) for two DM-L-403 supported catalyst produced polyethylene granules (Example 1).

FIGS. 6A-6F are the stereomicroscopic images (FIGS. 6A and 6D), the comonomer content maps (FIGS. 6B and 6E), and the volume-weighted comonomer content histograms (FIGS. 6C and 6F) for two DM-M-302 supported catalyst produced polyethylene granules (Example 1).

Example 2

Supported bis(1-butyl,3-methylcyclopentadienyl) zirconium dichloride) catalyst on D948 silica was used in a commercial gas-phase reactor to produce polyethylene. The reactor conditions were 85° C., 290 psi reactor pressure, 192 ppm $H_2$ concentration, 0.083 $C_6/C_2$ flow ratio, and 1.5 h residence time.

FIGS. 7A-7F are the stereomicroscopic images (FIGS. 7A and 7D), the comonomer content maps (FIGS. 7B and 7E), and the volume-weighted comonomer content histograms (FIGS. 7C and 7F) for two D948 supported catalyst produced polyethylene granules in a commercial gas-phase reactor.

Example 3

Supported bis(1-butyl,3-methylcyclopentadienyl) zirconium dichloride) catalyst on DM-L-403 silica was used in a salt-bed gas-phase batch reactor to produce polyethylene. The polymerization run were carried out according to the following procedure: a 2 L autoclave reactor was dried under nitrogen above 110° C. for 1 hour. 350 grams of salt and 5 grams of sMAO were charged into the reactor. The reactor was then stirred at 105° C. for 30 min. The reactor was then precharged with 2.5 mL of 1-hexene and 120 mL of hydrogen gas, and the reactor temperature was allowed to stabilize to 85° C. The polymerization was initiated by injecting 10 mg of supported catalyst with ethylene gas. During the run, the pressure of ethylene in the reactor was maintained at 220 psi. The hydrogen flow (diluted with nitrogen to 10%) was controlled at 0.5 of hydrogen to ethylene ratio (mg/g), and the 1-hexene flow was controlled at 0.1 of 1-hexene to ethylene ratio (g/g). The polymerization reaction had 1 hour reaction time.

FIGS. 8A-8F are the stereomicroscopic images (FIGS. 8A and 8D), the comonomer content maps (FIGS. 8B and 8E), and the volume-weighted comonomer content histograms (FIGS. 8C and 8F) for two DM-L-403 silica supported catalyst produced polyethylene granules in a salt-bed gas-phase reactor.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method to produce heterogeneous polyethylene granules, the method comprising:
   contacting first olefin monomers and second olefin monomers with a catalyst system in a single reaction zone to produce heterogeneous polyethylene granules and recovering the heterogeneous polyethylene granules;
   wherein the catalyst system comprises a product of a combination comprising:
      one or more catalysts having a Group 3 through Group 12 metal atom or lanthanide metal atom;
      at least one activator; and
      one or more support material compositions, comprising particulates having a surface area in the range of from 270 m$^2$/g to 680 m$^2$/g; and
   wherein the heterogeneous polyethylene granules comprise a product of a combination of:
      a first portion comprising a first polyethylene comprising the first olefin monomers and the second olefin monomers;
      a second portion comprising a second polyethylene comprising the first monomers and the second monomers; and
      wherein the first polyethylene has a higher second olefin monomer weight percent than the second polyethylene.

2. The method of claim 1, wherein the particulates have a pore size distribution such that 10 vol % to 80 vol % of pores in the particulates have a pore size of from 300 angstroms to 1500 angstroms.

3. The method of claim 1, wherein the single reaction zone is in a gas phase reactor, and wherein contacting occurs at a temperature of from 0° C. to 300° C., at a pressure in the range of from 0.35 MPa to 10 MPa, and at a time up to 500 minutes.

4. The method of claim 1, wherein the single reaction zone is in a gas phase reactor, and wherein contacting occurs at a temperature of from 255° C. to 100° C., at a pressure in the range of from 0.35 MPa to 10 MPa; and at a time up to 500 minutes.

5. The method of claim 1, wherein the single reaction zone is in a gas phase reactor, and wherein contacting occurs at a temperature of from 50° C. to 90° C., at a pressure in the range of from 0.35 MPa to 10 MPa, and at a time up to 500 minutes.

6. The method of claim 1, wherein the first polyethylene has a lower density than the second polyethylene.

7. The method of claim 1, wherein the second portion is at a core of the heterogeneous polyethylene granules and the first portion is at a surface of the heterogeneous polyethylene granules.

8. The method of claim 1, wherein the first portion is at a core of the heterogeneous polyethylene granules and the second portion is at a surface of the heterogeneous polyethylene granules.

9. The method of claim 1, wherein the second olefin monomer weight percent for the first polyethylene is about 11% to about 25% and the second olefin monomer weight percent in the second polyethylene is about 2% to about 8%.

10. The method of claim 1, wherein difference between the second olefin monomer weight percent for the first polyethylene and the second olefin monomer weight percent in the second polyethylene is about 5% to about 25%.

11. The method of claim 1, herein a volume-weighted comonomer content histogram has a variance of 2 wt %$^2$ or greater.

12. The method of claim 1, wherein a comonomer content line profile has a peak comonomer content minus a minimum comonomer content of from 8 wt % to 25 wt %.

13. The method of claim 1, wherein the first olefin monomer is ethylene and the second olefin monomer is selected from the group consisting of propylene, butene, pentene, hexene, heptene, octene, nonene, decene, undecene, and dodecene.

14. The method of claim 1, wherein the first olefin monomer is ethylene and the second olefin monomer is hexene.

15. The method of claim 1, wherein the particulates have a particle size distribution D50 of 36 microns or greater.

16. The method of claim 1, wherein a mean sphericity of the particulates is at least 0.970.

17. The method of claim 1, wherein the particulates comprise Al$_2$O$_3$, ZrO$_2$, SiO$_2$, SiO$_2$/Al2O3, SiO2/TiO$_2$, silica clay, silicon oxide/clay, or mixtures thereof.

18. The method of claim 1, wherein the particulates comprise SiO$_2$.

19. The method of claim 1, wherein the one or more catalysts is at least one metallocene catalyst.

20. The method of claim 1, wherein the at least one activator is methylaluinoxane and is present at a molar ratio of aluminum to catalyst metal of 200:1 or less.

21. The method of claim 1, wherein the one or more support material composition is $SiO_2$ and the catalyst system has an uncrushed (Al/Si/crushed (Al/Si) value of from 0.6 to 10 as determined by X-ray Photoelectron Spectroscopy.

22. The method of claim 1, wherein the catalyst system comprises the combination of a first catalyst and a second catalyst each having a different chemical structure, the second catalyst having a Group 3 through Group 12 metal atom or lanthanide metal atom.

23. A polyethylene polymer composition comprising heterogeneous polyethylene granules wherein the heterogeneous polyethylene granules comprise a product of a combination of:
 a first portion comprising a first polyethylene comprising the first olefin monomers and the second olefin monomers; and
 a second portion comprising a second polyethylene comprising the first monomers and the second monomers; wherein
  the first polyethylene has a higher second olefin monomer weight percent than the second polyethylene, and
  the polyethylene granules are produced according to claim 1.

24. The method of claim 1, wherein the particulates further have a pore volume in the range of from 1.2 cc/g to 2.5 cc/g.

* * * * *